United States Patent
Takebayashi et al.

(10) Patent No.: US 10,479,311 B2
(45) Date of Patent: Nov. 19, 2019

(54) AIRBAG COVER

(71) Applicants: TOYODA GOSEI CO., LTD., Kiyosu-shi, Aichi-ken (JP); HONDA MOTOR CO., LTD., Minato-ku, Tokyo (JP)

(72) Inventors: Keiichiro Takebayashi, Kiyosu (JP); Kento Maeda, Wako (JP); Shinsuke Odai, Wako (JP)

(73) Assignees: TOYODA GOSEI CO., LTD., Aichi-pref. (JP); HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 15/690,726

(22) Filed: Aug. 30, 2017

(65) Prior Publication Data
US 2018/0065586 A1 Mar. 8, 2018

(30) Foreign Application Priority Data

Sep. 5, 2016 (JP) .................................. 2016-172989

(51) Int. Cl.
*B60R 21/2165* (2011.01)
*B60R 21/206* (2011.01)
*B60R 21/215* (2011.01)

(52) U.S. Cl.
CPC ........ *B60R 21/2165* (2013.01); *B60R 21/206* (2013.01); *B60R 2021/21537* (2013.01)

(58) Field of Classification Search
CPC .......... B60R 21/2165; B60R 21/21656; B60R 21/206; B60R 2021/21537
See application file for complete search history.

(56) References Cited

U.S. PATENT DOCUMENTS 5,110,647 A * 5/1992 Sawada ................... B32B 27/08
428/43
5,195,773 A * 3/1993 Sawada ............. B60R 21/21656
280/728.3

(Continued)

FOREIGN PATENT DOCUMENTS

FR   2 761 940 A1    10/1998
JP   H10-236265 A    9/1998

(Continued)

OTHER PUBLICATIONS

Office Action dated Feb. 12, 2019 issued in corresponding Japanese patent application No. 2016-172989 (and English translation).

(Continued)

*Primary Examiner* — Ruth Ilan
(74) *Attorney, Agent, or Firm* — Posz Law Group, PLC

(57) ABSTRACT

An airbag cover adapted to be jointed with an airbag housing for covering an airbag housed in the housing. The airbag cover includes a door. In a circumference of the door, there are a hinge region which holds the door as opened, and a tearable region configured to break when pushed by the airbag. The tearable region includes a bridged tear region which includes perforations formed through the airbag cover and bridging regions disposed between the perforations, and is configured to break when the bridging regions break, and a thinned tear region which includes a continuous thinned region and is configured to break when the thinned region breaks. The bridged tear region is disposed at a leading end of the door as opened, distant from the hinge. The thinned tear region is disposed between both ends of the hinge region and both ends of the bridged tear region.

8 Claims, 14 Drawing Sheets

(56) References Cited

U.S. PATENT DOCUMENTS

| | | | | |
|---|---|---|---|---|
| 5,316,822 A | * | 5/1994 | Nishijima | B29C 37/0057 |
| | | | | 428/138 |
| 5,383,681 A | * | 1/1995 | Sato | B60R 21/21656 |
| | | | | 280/728.3 |
| 5,582,424 A | * | 12/1996 | Okuyama | B60R 21/2165 |
| | | | | 280/728.3 |
| 5,997,030 A | | 12/1999 | Hannert et al. | |
| 6,001,295 A | * | 12/1999 | Yamamoto | B29C 37/0057 |
| | | | | 264/296 |
| 8,585,078 B1 | | 11/2013 | Witt, Jr. et al. | |
| 9,481,338 B2 | * | 11/2016 | Mazur | B29C 44/06 |
| 2002/0149179 A1 | | 10/2002 | Holtz | |
| 2006/0022440 A1 | | 2/2006 | Umehara | |
| 2006/0220354 A1 | * | 10/2006 | Geltinger | B29C 59/007 |
| | | | | 280/728.3 |
| 2007/0024034 A1 | * | 2/2007 | Thomas | B60R 21/21656 |
| | | | | 280/731 |
| 2016/0121837 A1 | * | 5/2016 | Mazur | B29C 44/06 |
| | | | | 280/728.3 |

FOREIGN PATENT DOCUMENTS

| | | |
|---|---|---|
| JP | 2001-506204 A | 5/2001 |
| JP | 2002-347566 A | 12/2002 |
| JP | 2006-036141 A | 2/2006 |
| JP | 2009-067236 A | 4/2009 |

OTHER PUBLICATIONS

Office Action dated Aug. 28, 2018 issued in corresponding JP patent application No. 2016-172989 (and English translation).

* cited by examiner

Fig. 4
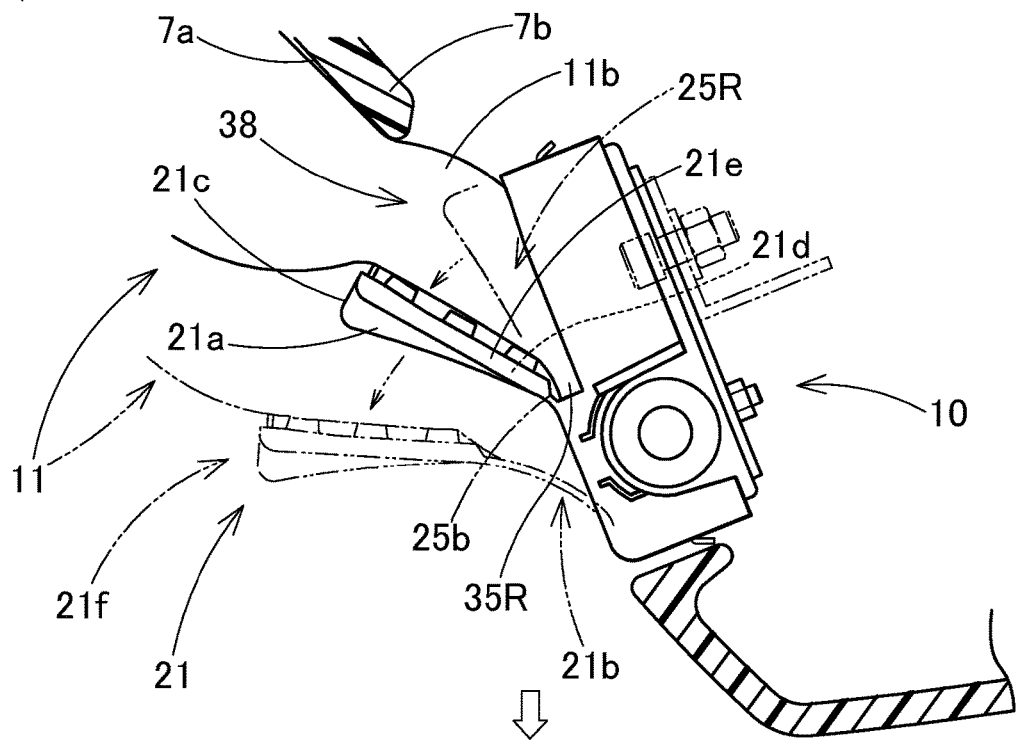
(A)
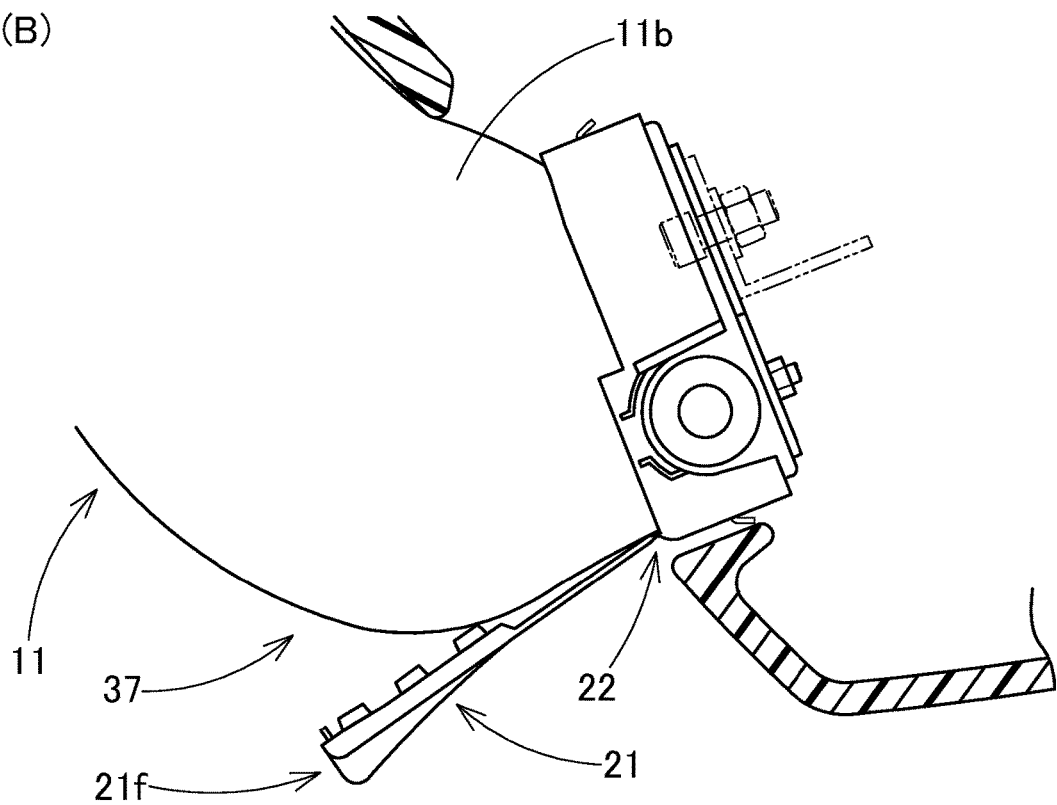
(B)

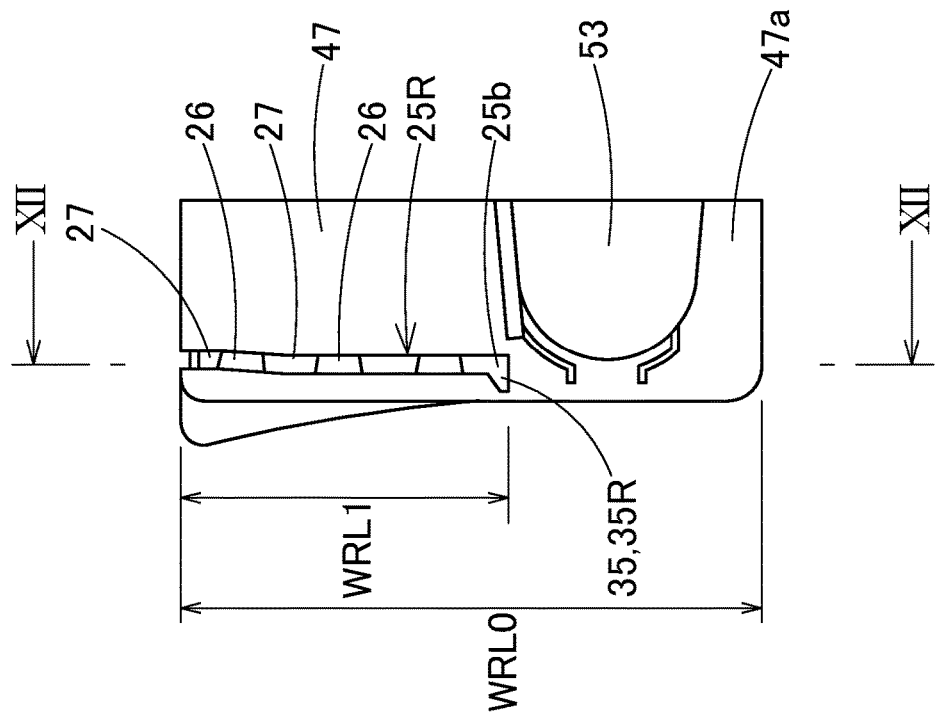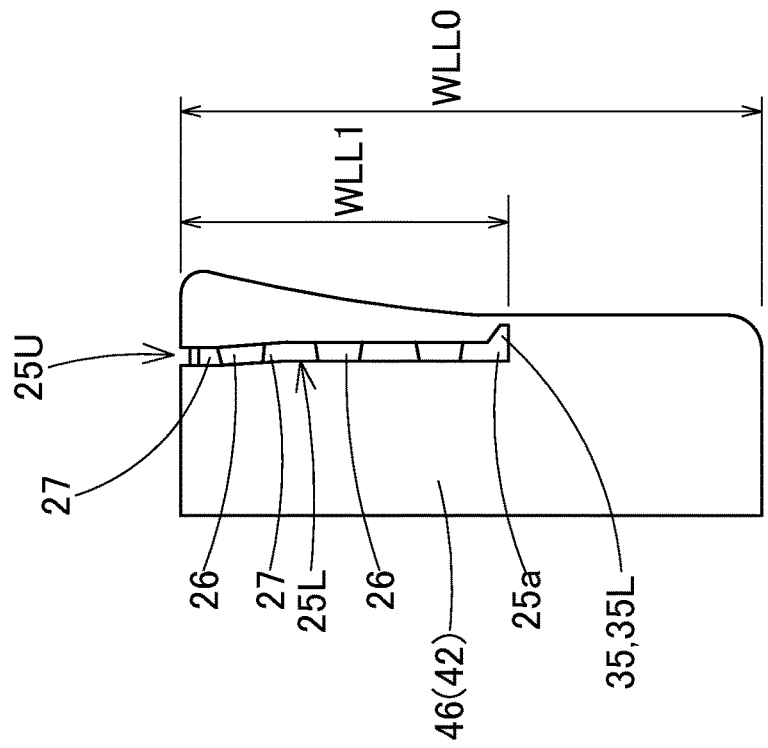

AIRBAG COVER

CROSS REFERENCE TO RELATED APPLICATIONS

The present application claims priority from Japanese Patent Application No. 2016-172989 of Takebayashi et al., filed on Sep. 5, 2016, the entire disclosure of which is incorporated herein by reference.

BACKGROUND OF THE INVENTION

1. Field of the Invention

The present invention relates to an airbag cover which covers an airbag of an airbag device for a vehicle in a stand-by mode and is configured to behave so as to allow an airbag emergence.

2. Description of Related Art

JP 2002-347566 A and JP 2006-036141 A disclose, by way of example, airbag devices for knee protection each of which includes a case, an airbag stored in the case in a folded-up configuration and an airbag cover which covers the airbag and is coupled with the case. The airbag cover is fabricated from such synthetic resin as polyolefin elastomer, and includes a ceiling wall for covering the airbag and a side wall which extends from a vicinity of an outer circumferential edge of the ceiling wall in a direction generally perpendicular to the ceiling wall. The airbag cover is coupled with the case by the side wall. The ceiling wall includes a door which is configured to open when pushed by the airbag as is inflated. The door includes, in the circumference, a tearable region which is configured to break when pushed by the airbag and a hinge region (an integral hinge) which bends and allows the door to open thereabout. The tearable region is a thinned tear region formed by providing a groove on a back side of the ceiling wall such that the bottom of the groove forms a thinned region which easily breaks when pushed by the airbag. Although having a little influence of a sink mark, this configuration of the tearable region has been appreciated because it does not appear on the outer surface and make the appearance of the ceiling wall good.

U.S. Pat. No. 8,585,078 B discloses a different configuration of the tearable region of an airbag cover called a "bridged tear region." The airbag cover of this prior art reference also includes a ceiling wall and a side wall extending from the ceiling wall. The bridged tear region is composed of a plurality of perforations which are intermittently formed on the side wall and a plurality of bridging regions which are so disposed as to connect the perforations. Specifically, the side wall is composed of a plurality of tabs which are configured to be coupled with the case, and spaces between the tabs constitute the perforations and root regions of the tabs constitute the bridges. In the bridged tear region configured as described above, the bridging regions break when subjected to a pulling force applied when the airbag pushes the ceiling wall. The bridged tear region of this kind would not be suitable for use in a visible portion of the airbag cover since the perforations have to be formed through the airbag cover.

The conventional airbag covers employ only either the thinned tear region or bridged tear region as the tearable region.

SUMMARY OF THE INVENTION

The present invention contemplates a combined use of a thinned tear region and a bridged tear region, and has an object to provide an airbag cover that will help deploy an airbag in a predetermined contour in a steady fashion with the combined use of a thinned tear region and a bridged tear region.

Another object of the invention is to provide an airbag cover having a good appearance even with a bridged tear region.

The airbag cover of the present invention is adapted to be jointed with an airbag housing for covering an airbag which is housed in the airbag housing in a folded-up configuration. The airbag cover includes a door which is openable when pushed by the airbag as inflated for allowing airbag emergence. In a circumference of the door, there are provided a tearable region which is configured to break when pushed by the airbag for allowing the door to open, and a hinge region which holds the door as opened. The tearable region includes a bridged tear region which includes a plurality of perforations formed through the airbag cover and a plurality of bridging regions disposed between the perforations, and is configured to break when the bridging regions break, and a thinned tear region which includes a continuous thinned region and is configured to break when the thinned region breaks. The bridged tear region is disposed at a leading end portion of the door as opened, distant from the hinge region. The thinned tear region is disposed in an area ranging from a first end of the hinge region to a first end of the bridged tear region and in an area ranging from a second end of the hinge region to a second end of the bridged tear region.

In the airbag cover of the invention, the bridged tear region of the tearable region is disposed in the leading end portion of the door, which is distant from the hinge region. The thinned tear regions is disposed at two areas, i.e. in the area ranging from the first end of the hinge region to the first end of the bridged tear region and in the area ranging from the second end of the hinge region to the second end of the bridged tear region. The bridged tear region is inferior in breaking strength to the thinned tear region because of the presence of the perforations formed through the airbag cover, even if each of the bridging regions of the bridged tear region has a slightly greater thickness than the thinned region of the thinned tear region. In other words, the bridged tear region provides a better cleaving performance than the thinned tear region and can cleave quickly. That is, when the door is pushed by the airbag, the bridged tear region starts to break prior to the thinned tear region and breaks fast.

Especially in the invention, the bridged tear region is disposed in the leading end portion of the door, which is distant from the hinge region, and there are disposed the thinned tear regions between the bridged tear region and the hinge region. In other words, the bridged tear region is disposed in a vicinity of the free end of the door. With this configuration, when the door is pushed by the airbag, the bridged tear region, especially a central region of the bridged tear region will start to cleave first, since the central region is disposed at the leading end of the door and is distant from the thinned tear region and thus easily subjected to stress concentration. Once the bridged tear region starts to break from the vicinity of the central region, the door will start to open from there and allow airbag emergence from there. That is, the airbag will steadily protrude out of an initial, small opening which is initially formed at the leading end of the door, and be steadied in deployment behavior in an initial stage of airbag deployment. Of course, if the bridged tear region breaks to both ends and then the thinned tear regions cleave until the hinge region, the door will open as a whole and form a full opening such that the airbag can be fully deployed via the full opening smoothly. Moreover, if an arrangement proportion of the bridged tear region and thinned tear regions in the tearable region is varied, an opening behavior of the leading end portion of the door as well as a deployment behavior of the airbag in an initial stage of deployment can be changed. A steady deployment behavior in the initial stage of deployment will also steady a following deployment behavior, which leads to a smooth airbag deployment.

Therefore, the airbag cover of the invention will help deploy the airbag in a predetermined contour in a steady fashion with a combined use of the thinned tear region and the bridged tear region.

The airbag cover of the invention may include a ceiling wall which has a first surface forming a decorative surface and a second surface, and a side wall which extends from an outer circumferential edge of the ceiling wall generally perpendicularly to the ceiling wall and towards a direction facing away from the decorative surface, and includes a joint region for joint with the airbag housing. In that instance it is desirable that:

the hinge region is disposed in a vicinity of an intersection of the ceiling wall and the side wall on an inner side of the side wall;

the bridged tear region is disposed in a portion of the side wall distant from the hinge region and between the joint region and the ceiling wall;

each of the thinned tear regions is composed of a groove that is formed on the second surface of the ceiling wall and forms the thinned region, the groove extending from each of the first and second ends of the hinge region along and in proximity to the side wall;

each of the thinned tear regions further includes a concave section that extends from the side wall to the second surface of the ceiling wall at each of the first and second ends of the bridged tear region in such a manner as to joint the bridged tear region and the groove; and the door comprises:
 a region of the ceiling wall surrounded by the thinned tear regions;
 a remaining region of the ceiling wall surrounded by the bridged tear region; and
 a region of the side wall ranging from the bridged tear region to the ceiling wall.

With this configuration, at airbag deployment, the bridging regions of the bridged tear region will be directly pulled by the ceiling wall pushed by the airbag, thus break quickly.

Further, with the above configuration, since the perforations of the bridged tear region are disposed on the side wall which extends generally perpendicularly to the ceiling wall towards the direction facing away from the decorative surface, the perforations will be hardly seen when mounted on the vehicle. Moreover, since the grooves forming the thinned tear regions are formed on the second surface, not on the decorative surface, of the ceiling wall, the thinned tear regions do not affect the appearance of the decorative surface. Therefore, the above configuration of the invention will contribute to maintaining of a good appearance of the airbag cover.

Moreover, since the door includes the region of the ceiling wall surrounded by the thinned tear regions, the remaining region of the ceiling wall surrounded by the bridged tear region, and the region of the side wall ranging from the bridged tear region to the ceiling wall, the door is configured to open a whole area of the ceiling wall surrounded by the side wall. This configuration will provide a large opening in a whole area inside the side wall, which will allow a smooth and quick airbag deployment.

In the above instance, it is desired that:
 the ceiling wall is formed into a generally rectangular plate and the side wall is formed into a generally square tube;
 the side wall includes a first wall portion and a second wall portion which are opposed to each other, and a third wall portion and a fourth wall portion which are opposed to each other in a direction orthogonal to an opposing direction of the first wall portion and second wall portion;
 the hinge region is disposed on the first wall portion of the side wall;
 the concave sections are disposed on the third wall portion and fourth wall portion; and
 the bridged tear region is disposed on the second wall portion and further continuously extends to the third wall portion and fourth wall portion up to positions adjoining the concave sections.

With this configuration, the bridged tear region having a superior cleaving performance is disposed over an entire second wall portion of the side wall which is distant from the hinge region, and further extends over the areas of the third wall portion and fourth wall portion distant from the hinge region. This configuration will form a generally rectangular opening at an area surrounded by the bridged tear region distant from the hinge region for allowing the airbag to exit in the initial stage of airbag deployment. That is, the airbag will firstly protrude out of this rectangular opening, not out of the large, full opening formed in the whole area inside the side wall. This configuration will be suitable for a deployment mode which is aimed to deploy the airbag at a vicinity of the second wall portion distant from the hinge region in an initial stage of airbag deployment.

In this instance, it is further desired that at least one of the third wall portion and fourth wall portion includes a through opening at a portion thereof distant from the bridged tear region and distant from the ceiling wall.

Such a through opening will be useful for receiving a part of an inflator for supplying the airbag with an inflation gas or a connector of the inflator. That is, this configuration will be useful for receiving any component of the airbag device which would be disposed inside the side wall and have to let a part of it out of the side wall.

In the above airbag cover of the invention, it is further desired that, in the bridged tear region, an intersection of the second wall portion and third wall portion and an intersection of the second wall portion and fourth wall portion are each composed of one of the perforations.

That is, if no bridging regions is disposed at the intersection or corner of the second wall portion and third wall portion and at the intersection or corner of the second wall portion and fourth wall portion, the bridged tear region will cleave smoothly when cleaving proceeds from the second wall portion to the third wall portion and fourth wall portion.

The airbag cover involved with another object of invention is also adapted to be jointed with an airbag housing for covering an airbag which is housed in the airbag housing in a folded-up configuration and deployable for protecting an object of protection. The airbag cover includes a ceiling wall which covers the airbag and has a first surface forming a decorative surface and a second surface, and a side wall which extends from an outer circumferential edge of the ceiling wall generally perpendicularly to the ceiling wall and towards a direction facing away from the decorative surface. The side wall includes a first portion and a second portion which are opposed to each other and each include a joint region for joint with the airbag housing. The ceiling wall is provided with a door which is configured to open when pushed by the airbag as inflated for allowing airbag emergence. A hinge region of the door, which holds the door as opened, is disposed in a vicinity of the ceiling wall on the first portion of the side wall. The airbag cover further includes a bridged tear region which is breakable for allowing the door to open. The bridged tear region is disposed on the second portion of the side wall between the joint region and the ceiling wall in a vicinity of a leading end of the door as opened, at a distance from the hinge region. The bridged tear region includes a plurality of perforations formed through the second portion of the side wall and a plurality of bridging regions disposed between the perforations, thus is configured to break when the bridging regions break. A groove denting from an outer surface of the side wall extends over a location of the bridged tear region, and the perforations of the bridged tear region are formed intermittently at the bottom of the groove.

With this configuration, since the perforations of the bridged tear region are disposed on the side wall which bends from the ceiling wall generally perpendicularly to the ceiling wall, the perforations are not easily seen. Moreover, since the perforations are formed at the bottom of the groove denting from the outer surface of the side wall, the perforations are hidden behind an edge of the groove and will be further unrecognizable. Even if the perforations can be seen, they cannot be seen clearly because they are disposed at a recessed and obscure area behind the edge of the groove.

Therefore, the airbag cover of the invention keeps a good appearance even with the bridged tear region having the perforations, because the perforations of the bridged tear region are not easily seen.

The above airbag cover may also be configured such that, when mounted on a vehicle, the decorative surface of the ceiling wall forms a generally flush surface together with a surrounding member of the vehicle and the second portion of the side wall disposed in the vicinity of the leading end of the door as opened is disposed at such a position that is easier to see from the object of protection in comparison with the first portion of the side wall. The perforations of the bridged tear region will yet not be easily recognizable because the perforations are hidden behind the edge of the groove. Therefore, the bridged tear region will not affect the appearance of the airbag cover.

BRIEF DESCRIPTION OF DRAWINGS

FIG. 4 depicts a behavior of the airbag device of FIG. 1 when actuated by side views;

FIG. 9A is a left side view of the airbag cover of FIG. 5;

FIG. 9B is a right side view of the airbag cover of FIG. 5;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
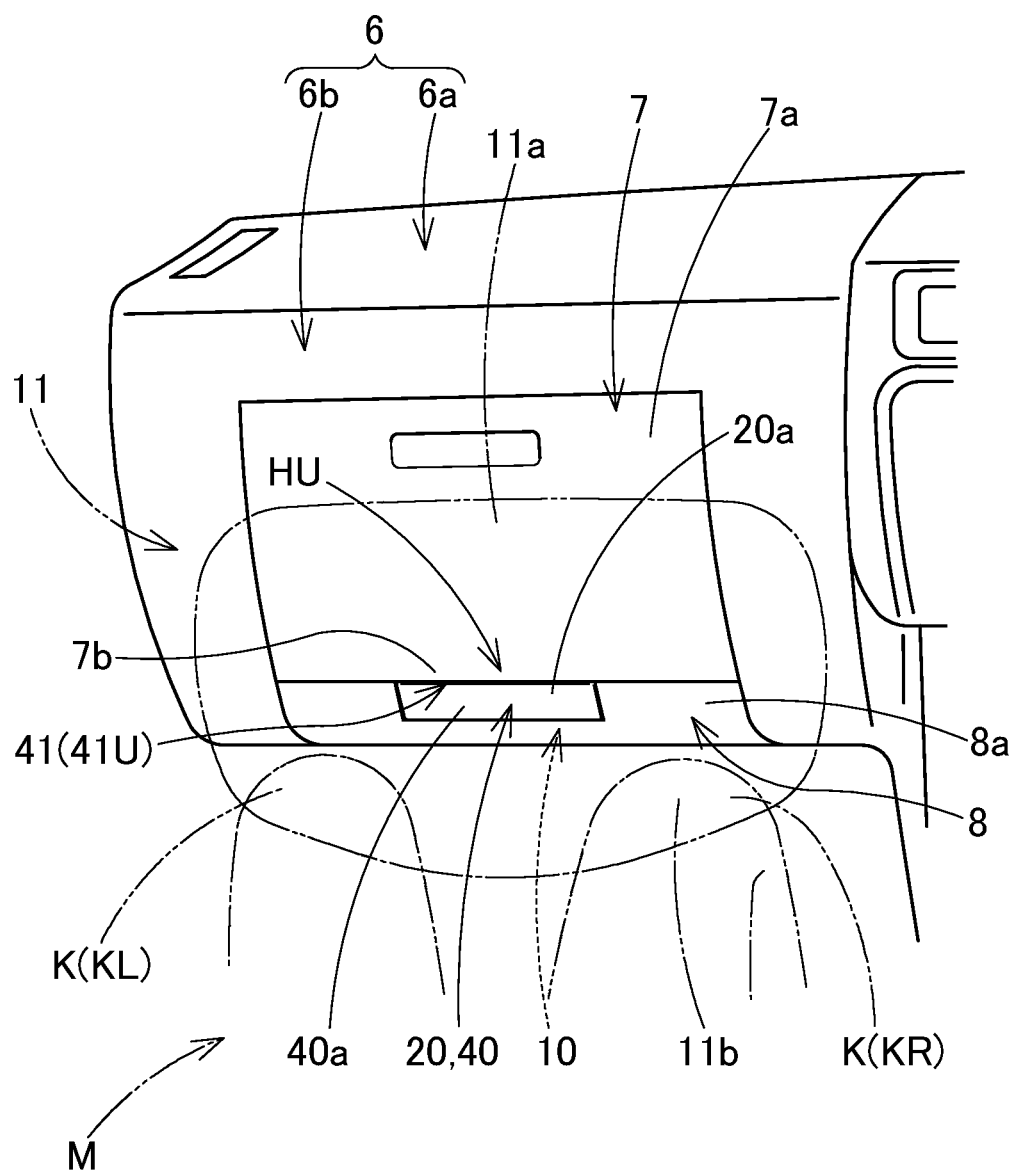
FIG. 1 is a schematic perspective view of an airbag device for knee protection provided with an airbag cover embodying the invention, as mounted on a vehicle.
Figure 2:
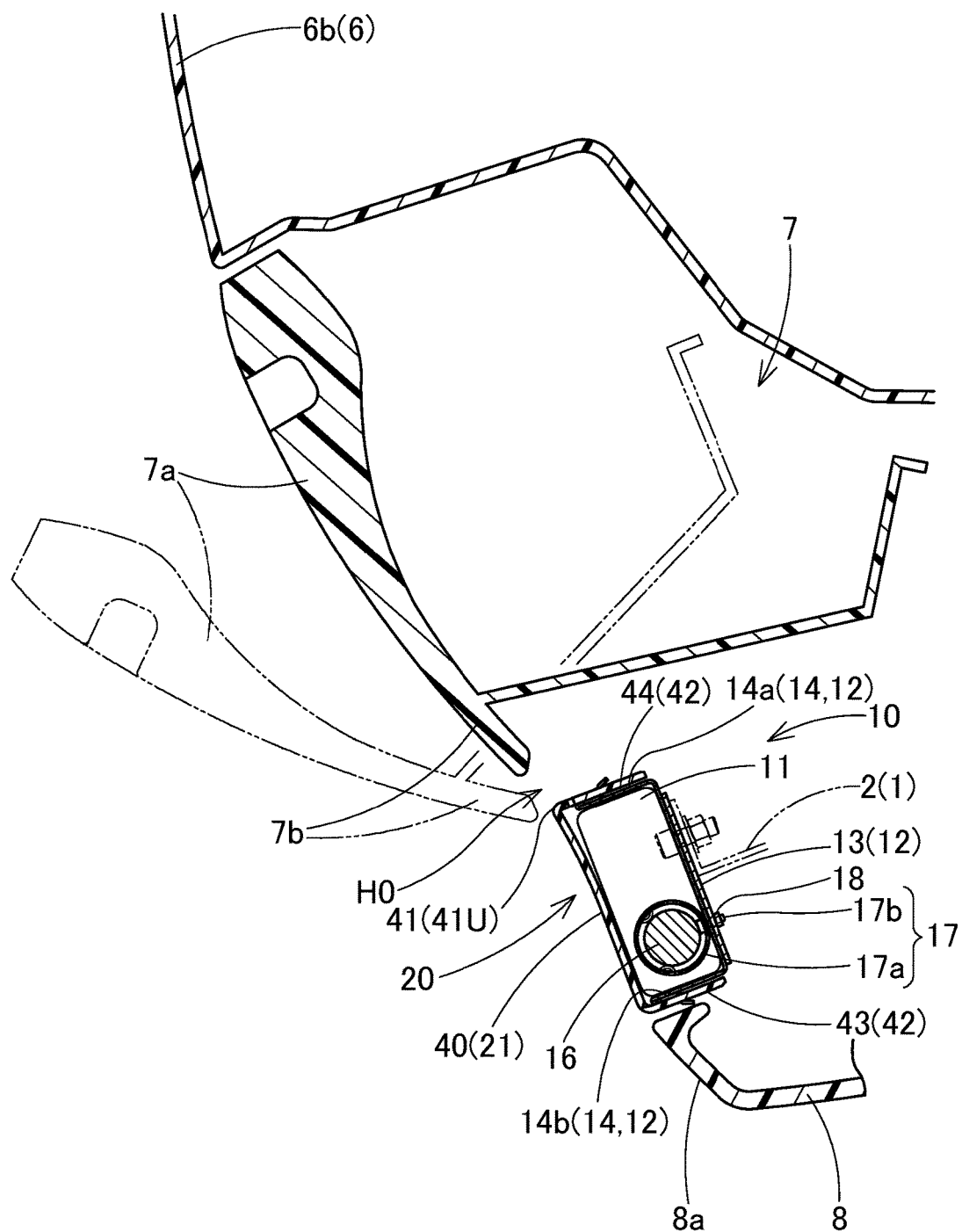
FIG. 2 is a schematic vertical sectional view of the airbag device of FIG. 1 as mounted on the vehicle.

As shown in FIGS. 1 and 2, an airbag cover 20 embodying the invention is employed in an airbag device 10 for knee protection which is mounted on a lower region of an instrument panel or dashboard 6 in front of a front passenger seat. The dashboard 6 includes a top plane region 6a and a rear plane region 6b extending downward from the rear end of the top plane region 6a, and the airbag device 10 is mounted beneath a glove box 7 disposed in the rear plan region 6b. As indicated with double-dotted lines in FIG. 2, the glove box 7 includes a rear panel 7a which is exposed on the rear side and openable rearward from the upper end. When closed, as shown in FIG. 1, the rear panel 7a is enclosed by the rear plane region 6b of the dashboard 6 on the upper side and left and right sides, and enclosed by a later-described ceiling wall 40 of the airbag cover 20 and a rear plane 8a of an undercover 8 on the lower side. The rear plane 8a of the undercover 8 has a U shape so as to adjoin left, right and lower sides of the ceiling wall 40 of the airbag cover 20. The glove box 7 is so formed, in a similar fashion to the ceiling wall 40 of the airbag cover 20, that the rear panel 7a extends diagonally downward and towards the front of the vehicle in a closed state so as to provide a legroom for the front seat passenger M.

Figure 3:
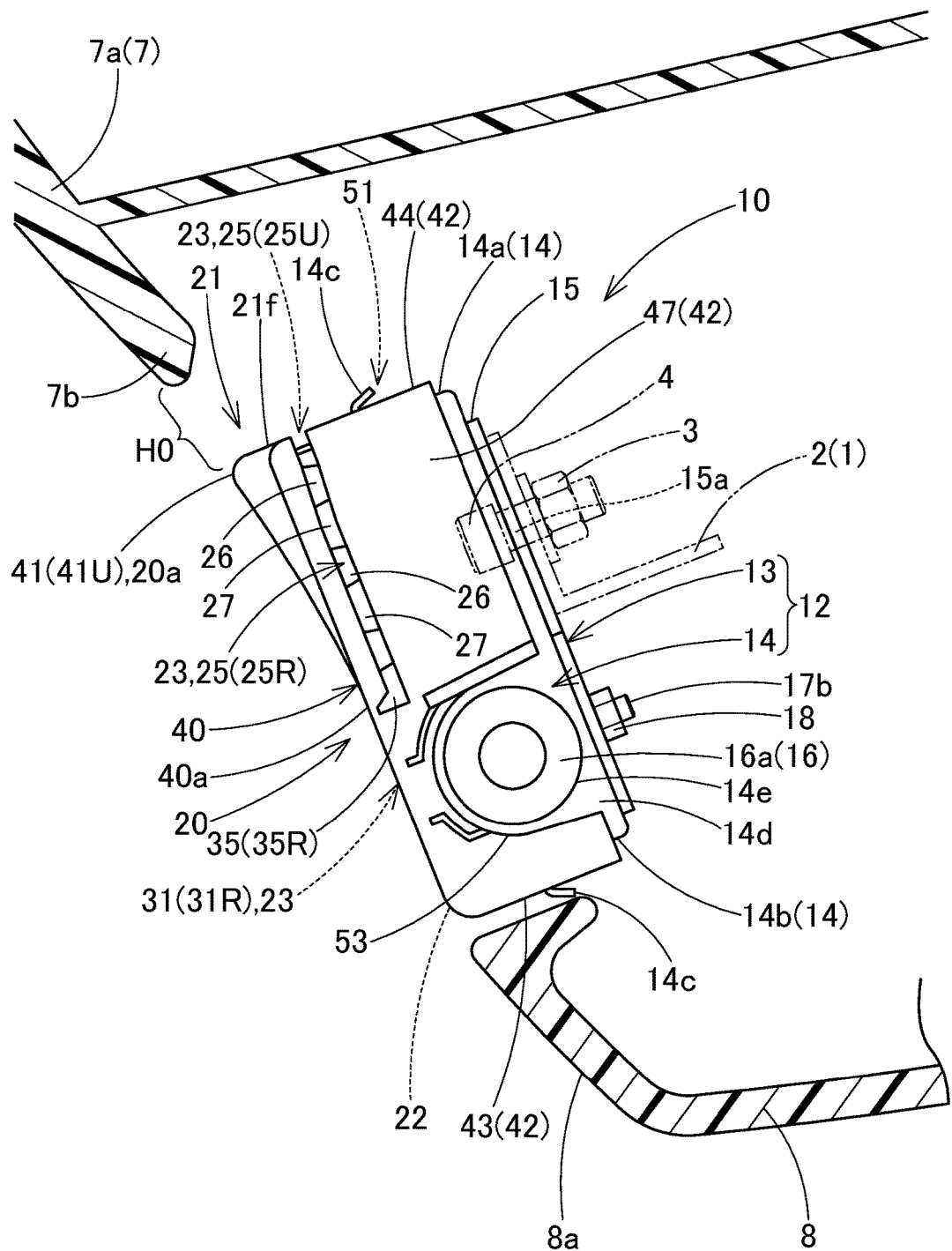
FIG. 3 is a schematic side view of the airbag device of FIG. 1 as mounted on the vehicle.

As shown in FIGS. 1 to 3, the airbag device 10 includes an airbag 11 which is folded up and deployable for protecting knees K (KL and KR) of the passenger M, an inflator 16 for feeding the airbag 11 with an inflation gas, a case 12 for housing and holding the airbag 11 and an airbag cover 20 which covers the airbag 11 and coupled to the case 12.

As shown in FIG. 4, the airbag 11 is designed to push and open a later-described door 21 of the airbag 20, exit the case 12 and protrude upwards and rearwards in front of the left and right knees KL and KR of the passenger M as indicated with double-dotted lines in FIG. 1. The airbag 11 is inflated into a generally rectangular board shape and deployed along curvature of the rear panel 7a of the glove box 7 and rear plane region 6b of the dashboard 6. An upper portion 11a of the airbag 11 as fully inflated, which is deployed close to the knees KL and KR, has a greater width in a left and right direction and a greater thickness than a lower portion 11b deployed close to the case 12. As shown in FIG. 2, the airbag 11 is mounted on the case 12 with the aid of the inflator 16 and retainer 17 which are put into the airbag 11. Specifically, the airbag 11 is mounted on the case 12 through the use of the inflator 16 and retainer 17 by the lower portion 11b as deployed.

As shown in FIG. 2, the inflator 16 has a cylindrical shape and is held by the retainer 17 on the outer circumference. The inflator 16 is disposed inside the airbag 11 and mounted on a later-described bottom wall 13 of the case 12 through the use of the retainer 17. The inflator 16 as mounted on the vehicle has a root end region 16a (FIG. 3) on the right end, and a leading end region (reference numeral omitted) on the left end. The root end region 16a is provided with a connector to which a not-shown lead wire is connected for feeding an actuating signal, and is so disposed as to protrude out of the airbag 11. The leading end region is provided with not-shown gas outlet ports for emitting an inflation gas. When mounted on the case 12, the root end region 16a is so disposed as to protrude out of an opening 14e of a right wall 14d of a later-described side wall 14 of the case 12 and a through opening 53 of a later-described side wall 42 of the airbag cover 20 to be exposed to the outside of the case 12 for connection with the lead wire.

As shown in FIG. 2, the retainer 17 includes an annular holding region 17a which is mounted around and holds the outer circumference of the inflator 16 and a plurality of bolts 17b protruding out of the holding region 17a. The bolts 17b are arranged along a left and right direction of the vehicle and put through the airbag 11 and bottom wall 13 of the case 12 and then fastened with nuts 18 so as to mount the airbag 11 and inflator 16 on the case 12.

Figure 10:
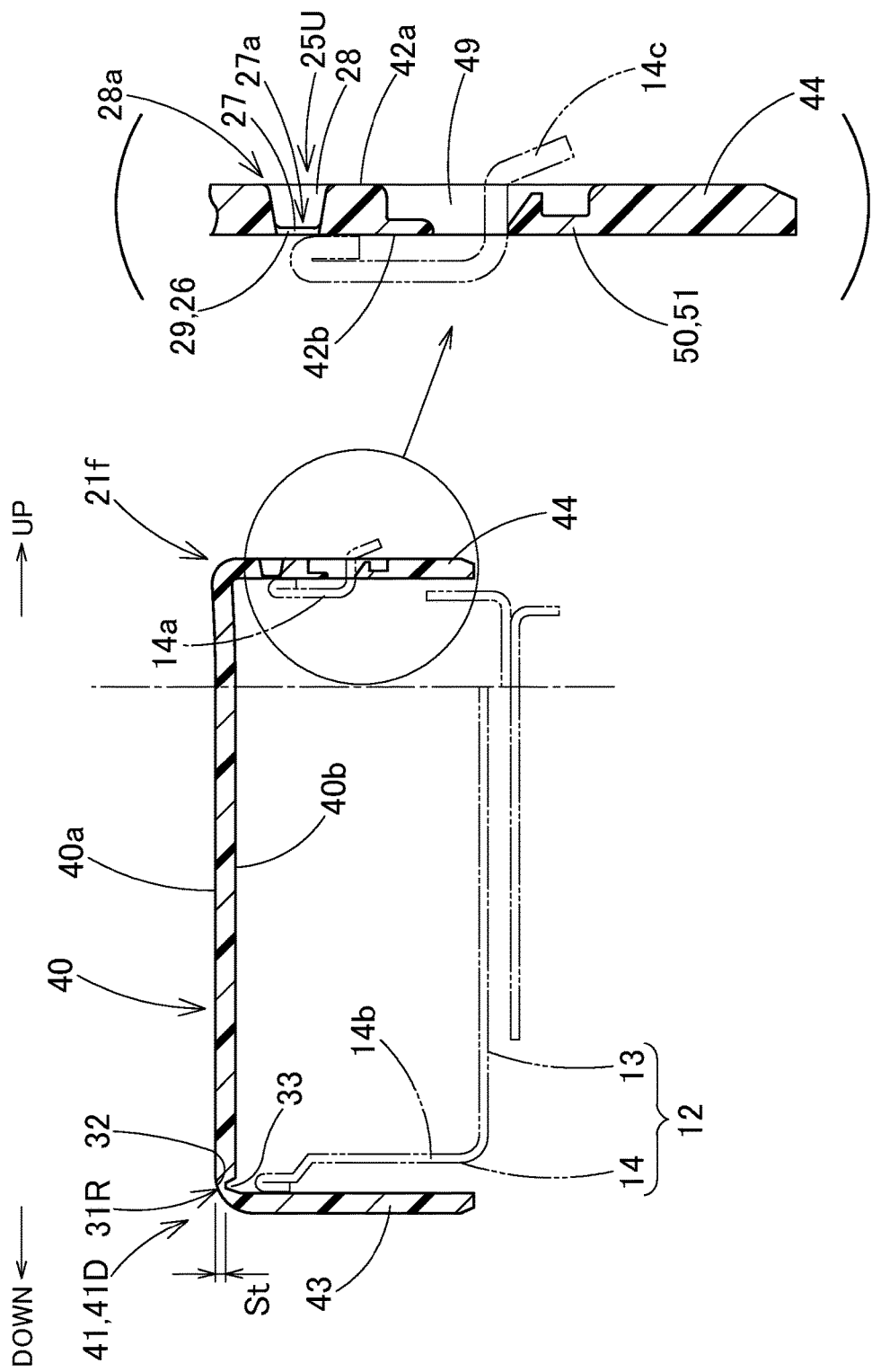
FIG. 10 is a sectional view of the airbag cover taken along line X-X of FIG. 6.

As shown in FIGS. 2 and 3, the case 12 is formed of sheet metal into a generally rectangular parallelepiped, and has a bottom wall 13 having a rectangular plate shape and a side wall 14 extending rearward from an outer circumferential edge of the bottom wall 13 in a generally square tubular shape, generally perpendicularly to the bottom wall 13. The side wall 14 has an upper wall 14a and a lower wall 14b which are opposed in an up and down direction. As shown in FIGS. 2, 3 and 10, the upper wall 14a and lower wall 14b are each provided with a plurality of retaining hooks 14c which are formed to bend outwardly and towards the bottom wall 13. The retaining hooks 14c are put into later-described retaining holes 49 formed on the side wall 42 of the airbag cover 20 to hold the airbag cover 20 such that the airbag cover 20 would stay in engagement with the case 12 at airbag deployment.

The airbag cover 20 is fabricated from synthetic resin such as polyolefin elastomer. As shown in FIGS. 2, 3 and 5 to 12, the airbag cover 20 includes a ceiling wall 40 which is formed into a generally rectangular plate shape elongated in a left and right direction and a side wall 42 which extends forward from an outer circumferential edge of the ceiling wall 40 generally perpendicularly to the ceiling wall 40. The side wall 42 is formed into a generally square tubular shape, and includes a first wall portion 43 and a second wall portion 44 which are opposed to each other in an up and down direction and each extends in a left and right direction, and a third wall portion 46 and a fourth wall portion 47 which are opposed to each other in a left and right direction and orthogonal to the first wall portion 43 and second wall portion 44. Each of the wall portions 43, 44, 46 and 47 has a generally flat plate shape.

A front surface (or first surface) of the ceiling wall 40 forms a decorative surface 40a exposed to a vehicle interior. When the airbag device 10 is mounted on board, the decorative surface 40a is generally flush with the rear panel 7a of the glove box 7 and rear plane 8a of the undercover 8.

Figure 7:
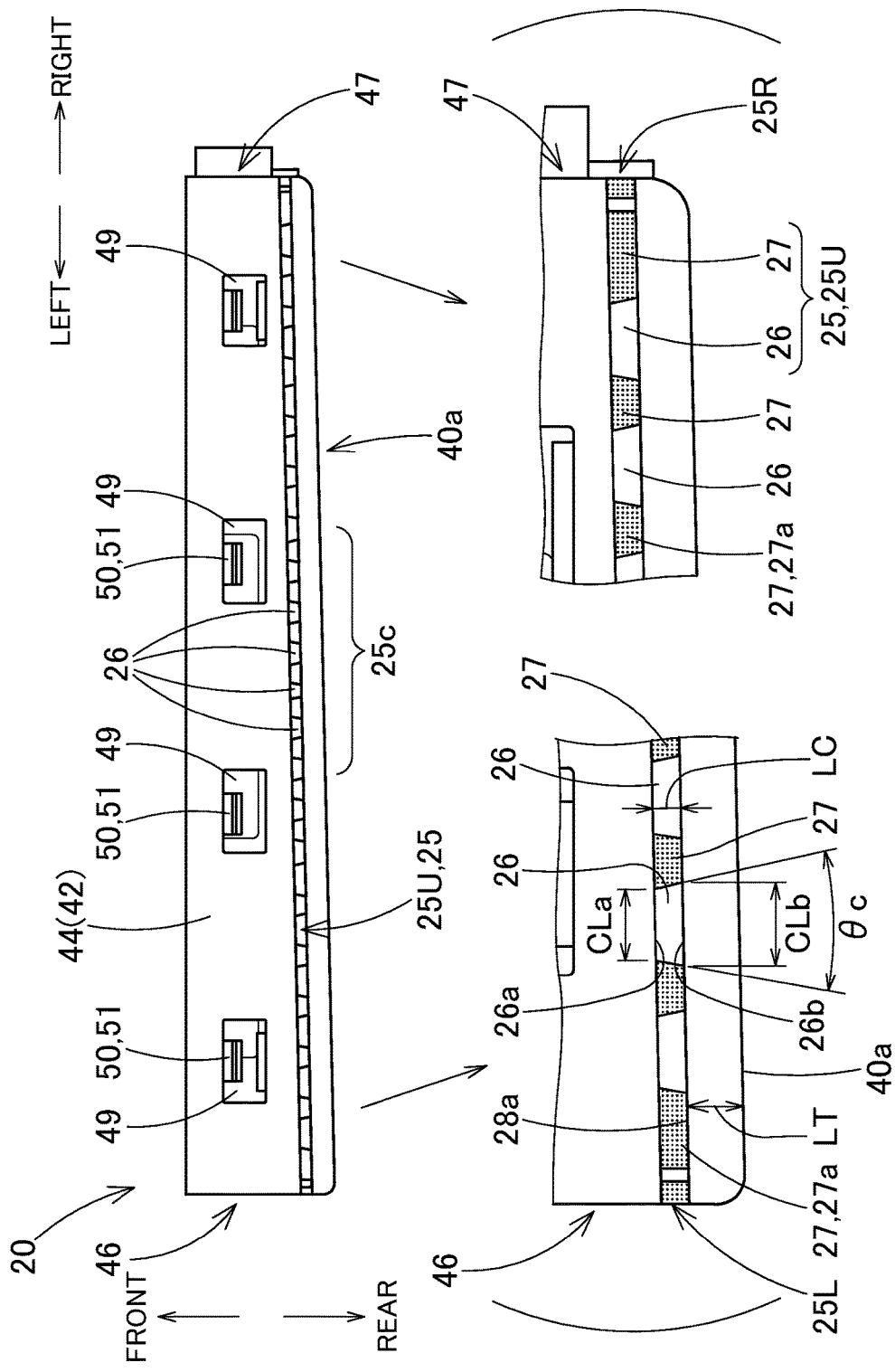
FIG. 7 is a plan view of the airbag cover of FIG. 5.
Figure 8:
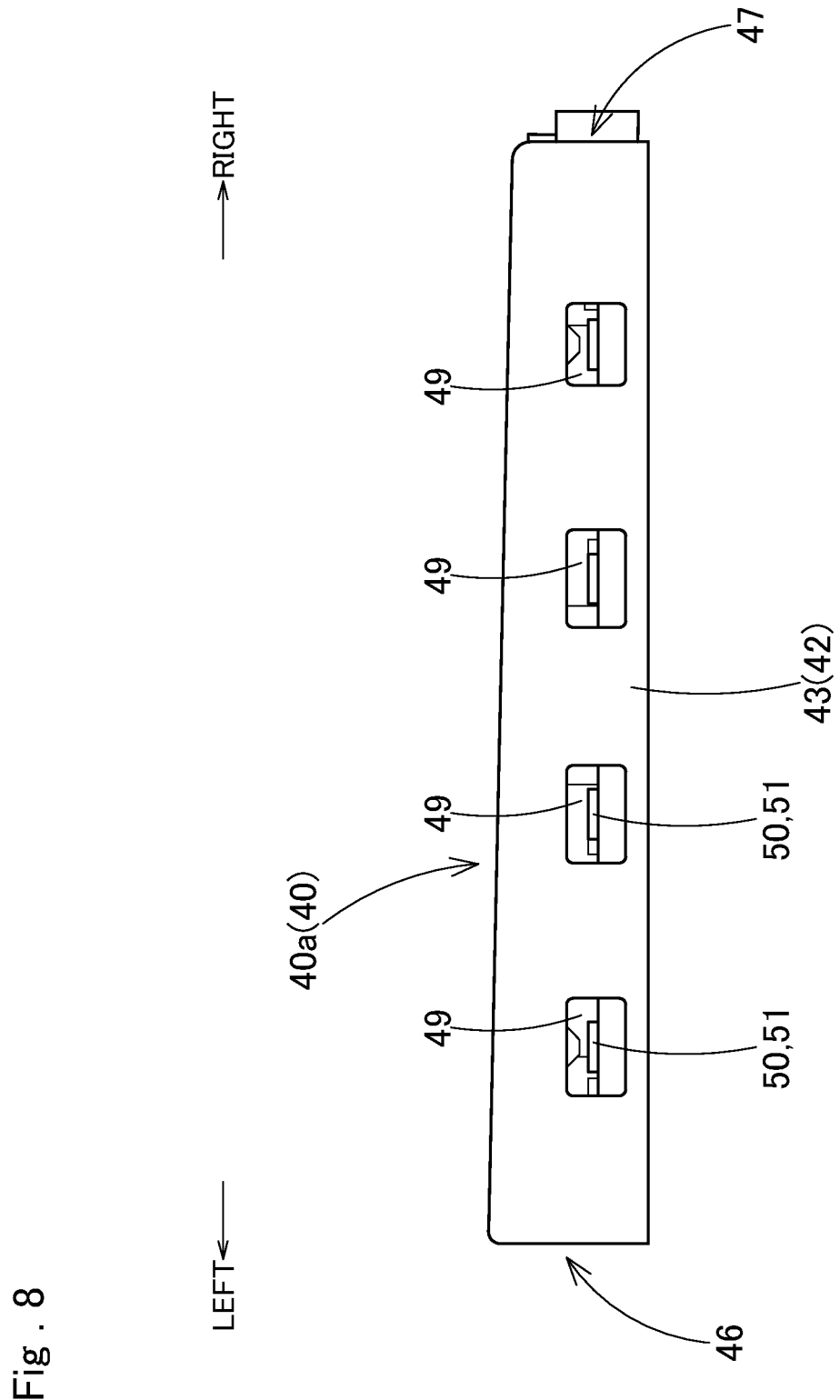
FIG. 8 is a bottom view of the airbag cover of FIG. 5.

As shown in FIGS. 7 and 8, the first wall portion 43 and second wall portion 44 of the side wall 42 are each provided with four retaining holes 49 for receiving the retaining hooks 14c of the case 12. Due to engagement with the retaining hooks 14c and peripheral regions of the retaining holes 49, the first wall portion 43 and second wall portion 44 are coupled with the case 12. In the illustrated embodiment, as shown in FIGS. 7, 8 and 10, each of the retaining holes 49 is provided, at the front region (i.e. at the region disposed towards the bottom wall 13 of the case 12) of the inner circumferential plane, a projecting region 50 which protrudes rearward (i.e. towards the ceiling wall 40). Each of the projecting regions 50 guides the retaining hook 14c through the retaining hole 49 and is retained by the retaining hook 14c. In the illustrated embodiment, each of the projecting regions 50 and its vicinity serves as a joint region 51 retained by the case 12.

The ceiling wall 40 of the airbag cover 20 is provided with a door 21 which is openable when pushed by the airbag 11 as inflated. The door 21 includes, in the circumference, a tearable region 23 which is configured to break when pushed by the airbag 11 and a hinge region 22 which bends and holds the door 21 as opened. The hinge region 22 is composed of an integral hinge. In the illustrated embodiment, the hinge region 22 is disposed in a lower edge region of the door 21 such that the door 21 opens downward.

The tearable region 23 of the illustrated embodiment includes two kinds of tear regions; a bridged tear region 25 and a thinned tear region 31. The bridged tear region 25 includes a plurality of perforations 27 each of which is formed through the airbag cover 20 and a plurality of bridging regions 26 disposed between the perforations 27, and is designed to break when the bridging regions 26 break. The bridged tear region 25 is disposed at a leading end 21f portion (i.e. at an upper edge region) of the door 21 distant from the hinge region 22. More specifically, the bridged tear region 25 is disposed at a position in the circumference of the door 21 farthest from the hinge region 22, in other words, at an opposite position from the hinge region 22 in the circumference of the door 21.

Figure 6:
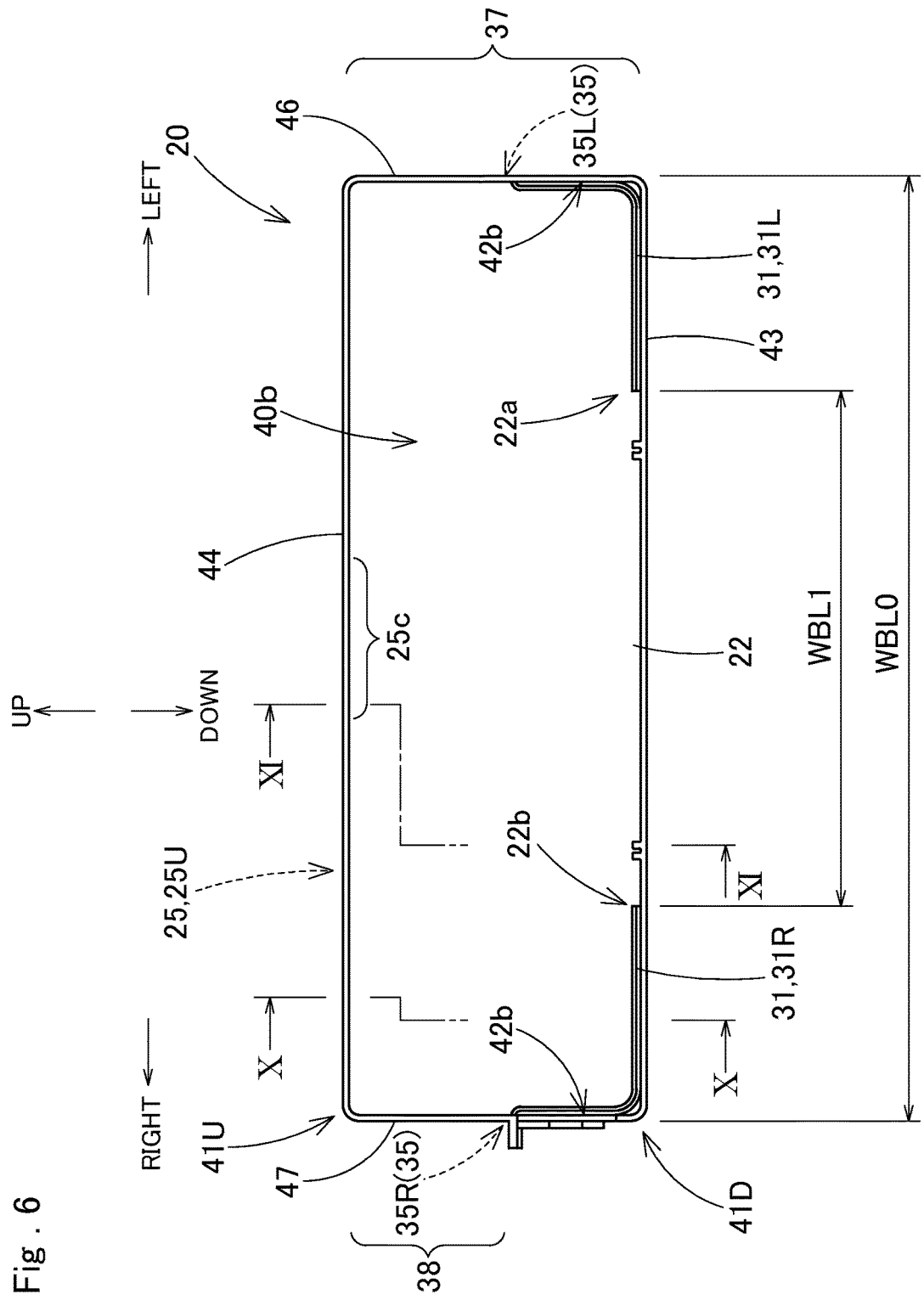
FIG. 6 is a rear view of the airbag cover of FIG. 5.

The thinned tear region 31 includes a continuous thinned region 32, and is designed to break when the thinned region 32 breaks. In the illustrated embodiment, as shown in FIG. 10, the thinned tear region 31 is formed by providing a groove 33 recessed in a V shape on the rear surface (on the second surface) 40b of the ceiling wall 40 such that the bottom of the groove 33 forms the thinned region 32. The thinned tear region 31 is disposed at an area of the circumference of the door 21 between the hinge region 22 and bridged tear region 25. That is, as shown in FIG. 6, a thinned tear region 31L is disposed between a left end 22a of the hinge region 22 and a left end 25a of the bridged tear region 25, and a thinned tear region 31R is disposed between a right end 22b of the hinge region 22 and a right end 25b of the bridged tear region 25.

More specifically, the hinge region 22 of the illustrated embodiment is disposed in a vicinity of an intersection 41 (41D) of the ceiling wall 40 and the first wall portion 43 (FIGS. 10 and 11) on an inner side of the first wall portion 43. Even more specifically, the hinge region 22 is located in a vicinity of the center in a left and right direction of the first wall portion 43, as shown in FIG. 6. The width WBL1 in a left and right direction of the hinge region 22 is about a half of the width WBL0 in a left and right direction of the first wall portion 43. In the illustrated embodiment, the width WBL0 of the first wall portion 43 is about 300 mm.

The bridged tear region 25 is disposed at an entire area of the second wall portion 44 of the side wall 42, which is distant from the hinge region 22, at an area of the third wall portion 46 adjacent the second wall portion 44, and at an area of the fourth wall portion 47 adjacent the second wall portion 44, as shown in FIGS. 7 and 9. In other words, the bridged tear region 25 includes a bridged tear region 25U which extends in a left and right direction between the joint region 51 with the case 12 and ceiling wall 40 (i.e. in proximity to the ceiling wall 40) in the second wall portion 44, a bridged tear region 25L which continues from the bridged tear region 25U and extends in an up and down direction in proximity to the ceiling wall 40 in the third wall portion 46 (FIG. 9A) and a bridged tear region 25R which continues from the bridged tear region 25U and extends in an up and down direction in proximity to the ceiling wall 40 in the fourth wall portion 47 (FIG. 9B). The dimension WLL1 of the bridged tear region 25L is about a half of the dimension WLL0 in an up and down direction of the third wall portion 46. The dimension WRL1 of the bridged tear region 25R is about a half of the dimension WRL0 in an up and down direction of the fourth wall portion 47. In the illustrated embodiment, the dimension WLL1 and the dimension WRL1 are about 50 mm.

Figure 11:
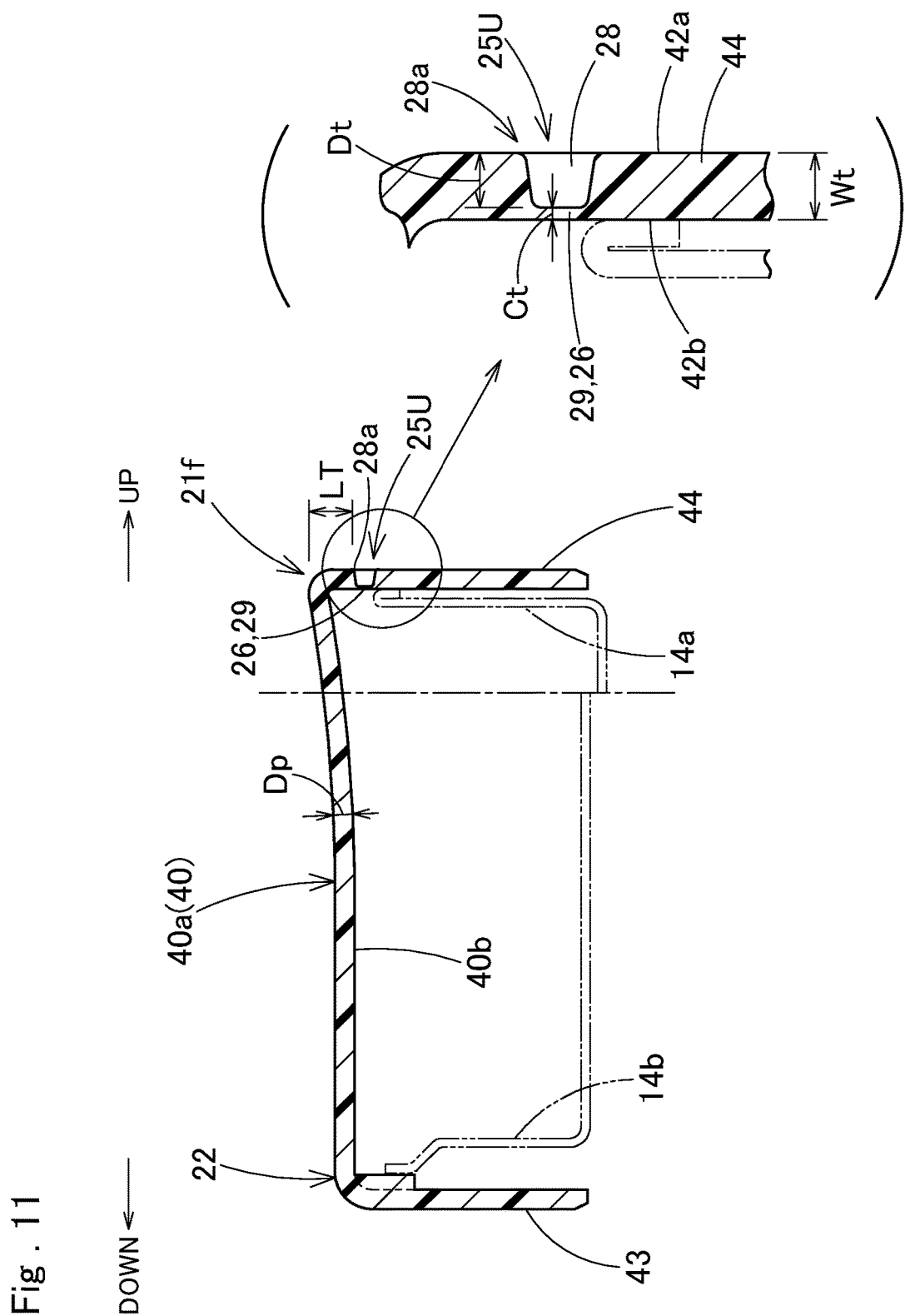
FIG. 11 is a sectional view of the airbag cover taken along line XI-XI of FIG. 6.
Figure 12:
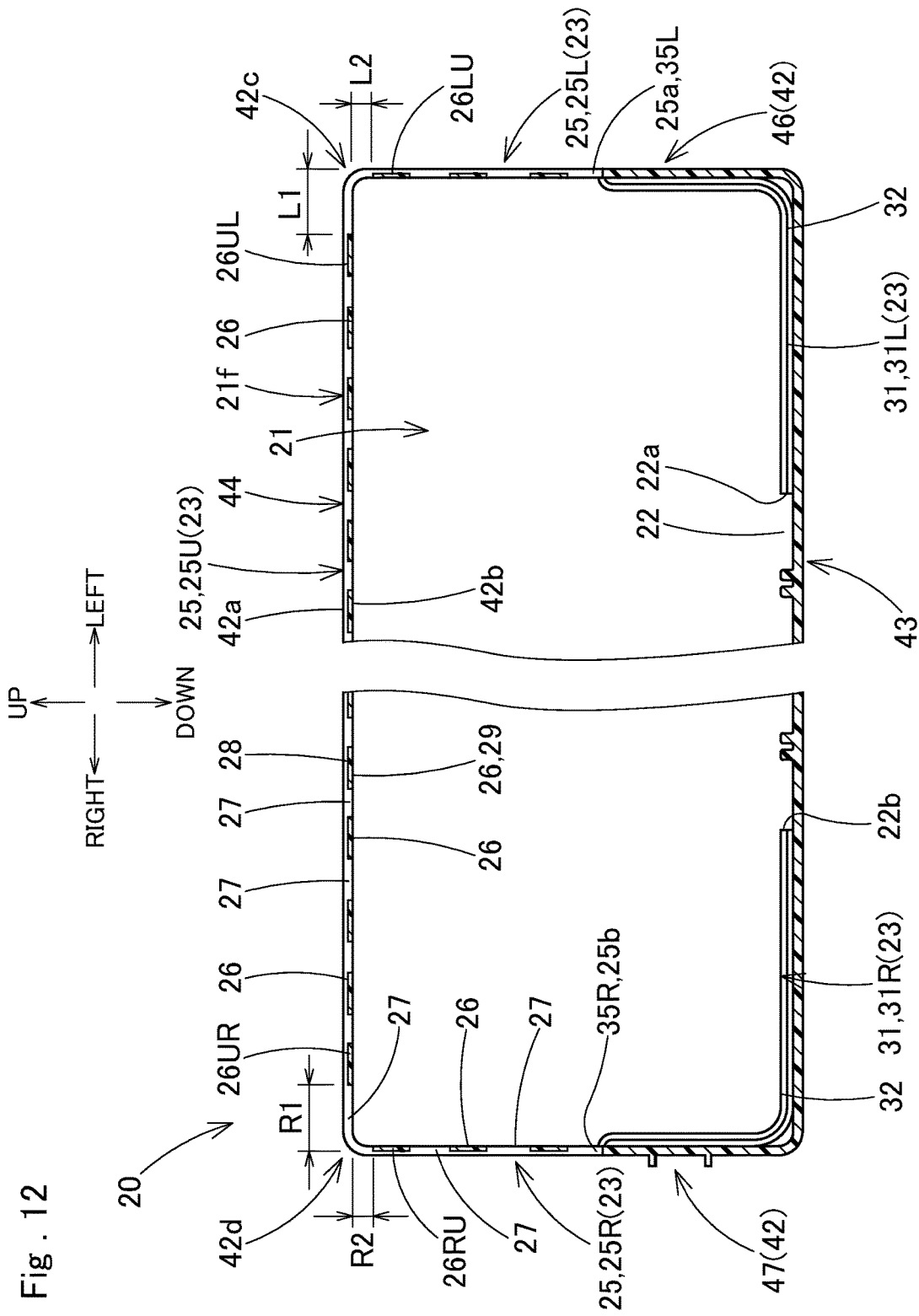
FIG. 12 is a schematic partial sectional view of the airbag cover taken at a bridged tear region, along line XII-XII of FIG. 9B.

In the illustrated embodiment, as shown in FIGS. 10 to 12, the second, third and fourth wall portions 44, 46 and 47 are provided with a groove 28 which dents from an outer surface 42a and extends over the location of the bridged tear regions 25U, 25L and 25R. The perforations 27 of the bridged tear region 25 are formed at the bottom 29 of the groove 28.

As shown in FIG. 7, each of the bridging regions 26 of the bridged tear region 25 (25U, 25L and 25R) has such a shape that the width CLb of the rear edge 26b, which is closer to the ceiling wall 40, is greater than the width CLa of the front edge 26a which is less close to the ceiling wall 40. That is, the width of each of the bridging regions 26 is not uniform in a front and rear direction. Each of the bridging regions 26 is formed into a trapezoidal plate which widens in width towards the ceiling wall 40 so as to induce stress concentration on the front edge 26a.

In the illustrated embodiment, although there is some variability, the width CLa of the front edge 26a of each of the bridging regions 26 is about 5 to 8 mm, and the angle θc at which each of the bridging regions 26 enlarges towards the rear edge 26b is about 22 degree. The thickness Ct (FIG. 11) of each of the bridging regions 26 of the bridged tear region 25 is about 0.5 mm. The length LC (FIG. 7) of each of the bridging regions 26 is about 2.2 mm, which is generally identical to the width of the groove 28. Further, as shown in FIG. 11, the thickness Wt of a general region of the second, third and fourth wall portions 44, 46 and 47 with no bridged tear region 25, is about 2.5 mm, and the depth Dt of the groove 28 to the bridging region 26 is about 2 mm, and the distance LT (FIGS. 7 and 11) of the bridged tear region 25 from the decorative surface 40a (specifically, a distance between the decorative surface 40a and an edge 28a of the groove 28) is about 5 mm, which is greater than the thickness Dp (about 2.5 mm) of the ceiling wall 40.

As viewed from the outer surface 42a of the side wall 42, an opening 27a of each of the perforations 27 of the bridged tear region 25 has a slightly greater opening area than an area of an adjoining bridging region 26. Especially, in the bridged tear region 25U formed on the second wall portion 44 with a width WBL0 of about 300 mm, which is equal to that of the first wall portion 43, there are disposed twenty bridging regions 26, and widths CLa of those bridging regions 26 are gradually reduced towards a central region 25c such that a breakage initiates from the central region 25c in a steady fashion. Specifically, a width CLa of each of the bridging regions 26 disposed in the left and right end regions close to the third wall portion 46 and fourth wall portion 47 is about 8 mm, and a width CLa of each of the bridging regions 26 in the central region 25c is about 5 mm. However, the perforations 27 have a uniform opening area in the entire bridged tear region 25U. Each of the bridged tear regions 25L and 25R with the width WLL1/WRL1 of about 50 mm has three bridging regions 26 as shown in FIGS. 9 and 12. The width of each of the bridging regions 26 in the bridged tear regions 25L and 25R is generally the same as that of each of the bridging regions 26 disposed in the left or right end region close to the third wall portion 46/fourth wall portion 47.

Moreover, as shown in FIG. 12, no bridging regions 26 is disposed at the intersection or corner 42c of the second wall portion 44 and third wall portion 46 and at the intersection or corner 42d of the second wall portion 44 and fourth wall portion 47. In other words, in the bridge tear region 25, the intersection 42c of the second wall portion 44 and third wall portion 46 and the intersection 42d of the second wall portion 44 and fourth wall portion 47 are each composed of one of the perforations 27. That is, a leftmost bridging region 26UL of the second wall portion 44 is disposed at a distance L1 from the corner 42c and an uppermost bridging region 26LU of the third wall portion 46 is disposed at a distance L2 from the corner 42c. Similarly, a rightmost bridging region 26UR of the second wall portion 44 is disposed at a distance R1 from the corner 42d and an uppermost bridging region 26RU of the fourth wall portion 47 is disposed at a distance R2 from the corner 42d.

As described above, the thinned tear region 31 includes the thinned tear region 31L and thinned tear region 31R which are disposed on the left and right sides between the hinge region 22 and the bridged tear regions 25L and 25R. Each of the thinned tear regions 31L and 31R includes a V-groove 33 formed on the rear surface (second surface) 40b of the ceiling wall 40 for forming the thinned region 32, and a concave section 35 which extends from the third wall portion 46 or fourth wall portion 47 of the side wall 42 to the second (rear) surface 40b of the ceiling wall 40 at the end 25a or 25b of the bridged tear region 25 in such a manner as to joint the bridged tear region 25 and the groove 33. Each of the grooves 33 is formed along and in proximity to the third wall portion 46/fourth wall portion 47 and first wall portion 43. More specifically, as shown in FIGS. 6, 9A and 12, the thinned tear region 31L includes a V-groove 33 which extends, on the second surface 40b of the ceiling wall 40, from the left end 22a of the hinge region 22 along an inner surface 42b of the first wall portion 43 and third wall portion 46 to the end 25a of the bridged tear region 25L and a concave section 35L which is recessed towards the front surface (first surface) 40a of the ceiling wall 40 and penetrates the third wall portion 46 at the end 25a of the bridged tear region 25L and joints the V-groove 33 and the bridged tear region 25L. As shown in FIGS. 6, 9B and 12, the thinned tear region 31R includes a V-groove 33 which extends, on the second surface 40b of the ceiling wall 40, from the right end 22b of the hinge region 22 along the inner surface 42b of the first wall portion 43 and fourth wall portion 47 to the end 25b of the bridged tear region 25R and a concave section 35R which is recessed towards the front surface (first surface) 40a of the ceiling wall 40 and penetrates the fourth wall portion 47 at the end 25b of the bridged tear region 25R and joints the V-groove 33 and the bridged tear region 25R.

The thickness St (FIG. 10) of the thinned region 32 of each of the thinned tear regions 31 (31L and 31R) is about 0.5 mm.

Figure 5:
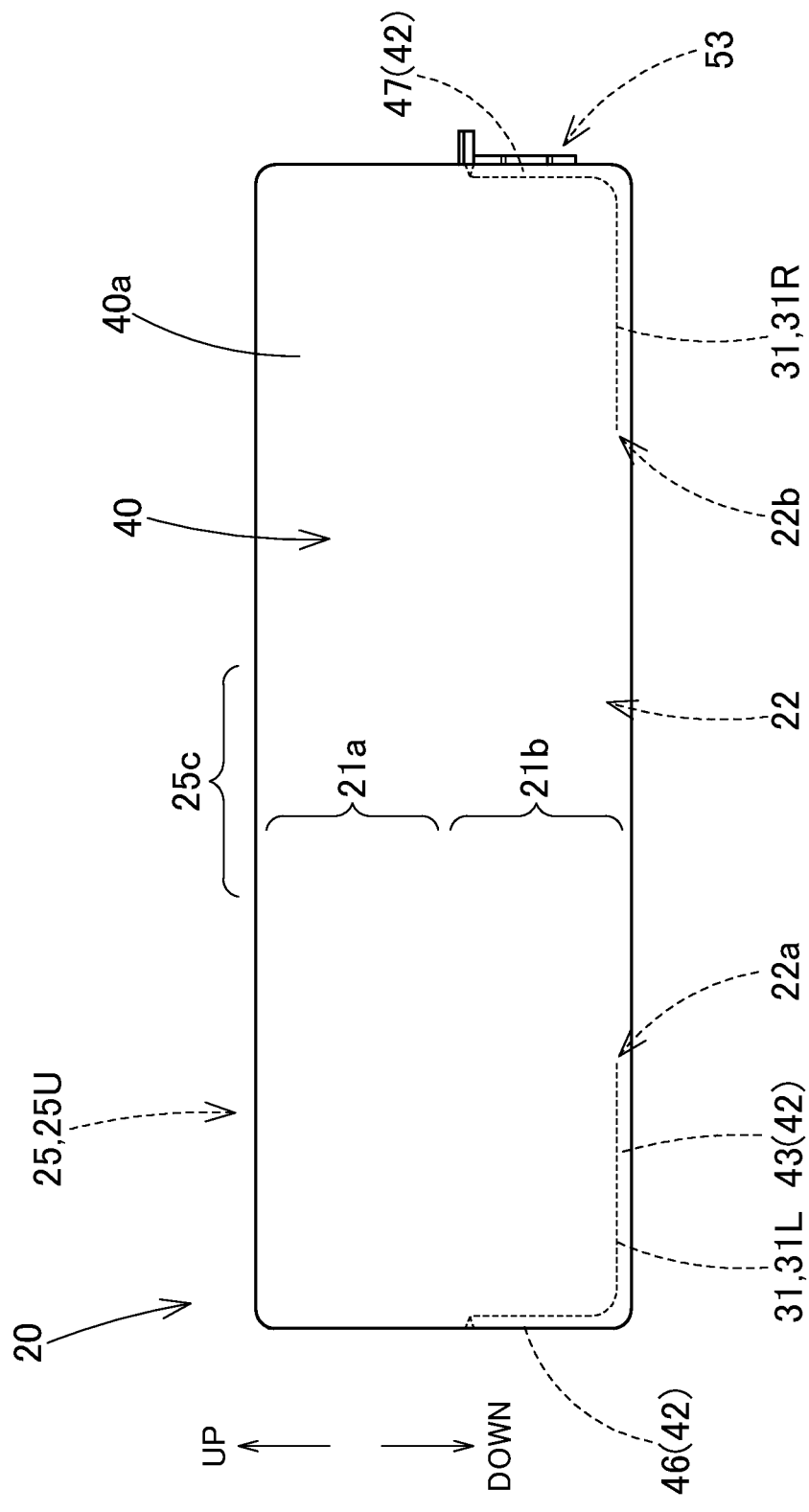
FIG. 5 is a front elevation of the airbag cover embodying the invention.

Due to the presence of the bridged tear regions 25U, 25L and 25R and thinned tear regions 31L and 31R, the door 21 includes a lower ceiling region 21b which is a region of the ceiling wall 40 surrounded by the thinned tear regions 31L and 31R, an upper ceiling region 21a which is a remaining region of the ceiling wall 40 surrounded by the bridged tear regions 25U, 25L and 25R, and a region of the side wall 42 ranging from the bridged tear region 25 to the ceiling wall 40, as shown in (A) of FIG. 4 and FIG. 5. The region of the side wall 42 ranging from the bridged tear region 25 to the ceiling wall 40 includes, more specifically, an upper side region 21c which is a region of the second wall portion 44 of the side wall 42 from the bridged tear region 25U to the ceiling wall 40, a left side region 21d which is a region of the third wall portion 46 of the side wall 42 from the bridged tear region 25L to the ceiling wall 40, and a right side region 21e which is a region of the fourth wall portion 47 of the side wall 42 from the bridged tear region 25R to the ceiling wall 40.

In the illustrated embodiment, the fourth wall portion 47 of the side wall 42 is provided with a generally semicircular through opening 53 for receiving the root end region 16a of the inflator 16.

Assembling of the airbag device 10 is now described. Firstly, the retainer 17 is placed inside the airbag 11 such the bolts 17b of the retainer 17 protrude out of the airbag 11. Then the airbag 11 is folded up and housed in the case 12 such that the bolts 17b protrude out of the bottom wall 13 of the case 12. Subsequently, the airbag cover 20 is placed over the case 12 and coupled with the case 12 by putting the retaining hooks 14c of the case 12 into the retaining holes 49 formed on the first wall portion 43 and second wall portion 44 of the side wall 42 of the airbag cover 20. Then the inflator 16 is inserted into the airbag 11 via the through opening 53 of the airbag cover 20 and opening 14e of the side wall 14 of the case 12 until the inflator 16 reaches a predetermined region of the holding region 17a of the retainer 17. Then the bolts 17b of the retainer 17 are fastened with nuts 18 such that the holding region 17a is brought close to the bottom wall 13 of the case 12 and the holding region 17a holds the outer circumference of the inflator 16 tightly. Thus the airbag device 10 is completed.

Thereafter, mounting brackets 15 of the case 12 are mounted on brackets 2 extending from such a vehicle body structure as an instrument panel reinforcement with bolts 3 and nuts 4. Thus the airbag device 10 is mounted beneath the glove box 7 in front of the front passenger seat. Then if lead wires extending from a not-shown control device for actuating the airbag device 10 are connected to the connector of the root end region 16a of the inflator 16 and the undercover 8 is mounted beneath the airbag device 10, the mounting work of the airbag device 10 on the vehicle is completed.

In this mounted state, the second wall portion 44 of the airbag cover 20, on which the bridged tear region 25U is disposed, is disposed above the first wall portion 43, and the third wall portion 46 and fourth wall portion 47 are opposed to each other in a left and right direction.

If the airbag device 10 is inflated, the inflator 16 will feed the airbag 11 with an inflation gas, and the airbag 11 will be inflated and push the door 21 disposed on the ceiling wall 40 of the airbag cover 20. Then the tearable region 23 of the door 21 will break and the hinge region 22 will bend, and the door 21 will open rearwards and downwards about the hinge region 22, as shown in FIG. 4. Thus the airbag 11 will be allowed to exit the case 12 via an opening 37 formed by the opening of the door 21, and be deployed along the rear panel 7a of the glove box 7 and rear plane region 6b of the dashboard 6 for protecting knees KL and KR of the passenger M.

In the airbag cover 20 of the illustrated embodiment, the bridged tear region 25 of the tearable region 23 is disposed in an area in a vicinity of the leading end 21f of the door 21, which is distant from the hinge region 22, and the thinned tear regions 31 are disposed at two areas, i.e. in the area ranging from the first end 22a of the hinge region 22 to the first end 25a of the bridged tear region 25 and in the area ranging from the second end 22b of the hinge region 22 to the second end 25b of the bridged tear region 25. In the illustrated embodiment, the bridging regions 26 of the bridged tear region 25 each have the same thickness as the thinned region 32 of the thinned tear region 31. However, even if the bridging region 26 of the bridged tear region 25 has a slightly greater thickness than the thinned region 32 of the thinned tear region 31, the bridged tear region 25 would be still inferior in breaking strength to the thinned tear region 31 because of the presence of the perforations 27 formed through the airbag cover 20. In other words, the bridged tear region 25 provides a better cleaving performance than the thinned tear region 31 and can cleave quickly. Specifically, when the door 21 is pushed by the airbag 11, the bridged tear region 25 starts to break earlier than the thinned tear regions 31 and breaks fast.

Especially in the illustrated embodiment, the bridged tear region 25, which has an inferior breaking strength to the thinned tear region 31, is disposed in the area in the vicinity of the leading end 21f of the door 21, which is distant from the hinge region 22, and there are disposed the thinned tear regions 31L and 31R between the bridged tear region 25 and the hinge region 22. In other words, the bridged tear region 25 is disposed in a vicinity of the free end of the door 21. With this configuration, when the door 21 is pushed by the airbag 11, the bridged tear region 25, especially the central region 25c (FIGS. 6 and 7) of the bridged tear region 25 will start to cleave first (FIG. 3 and (A) of FIG. 4), since the central region 25c is disposed at the leading end 21f of the door 21 and is distant from the thinned tear region 31 and thus easily subjected to stress concentration. Once the bridged tear region 25 starts to break from a vicinity of the central region 25c, the door 21 will start to open from there and allow airbag emergence from there. That is, with the above configuration, the airbag 11 will steadily protrude out of a small opening 38 initially formed at the leading end 21f of the door 21, thus be steadied in deployment behavior in an initial stage of airbag deployment. Of course, if the bridged tear region 25 breaks to the ends 25a and 25b and then the thinned tear regions 31L and 31R cleave until the hinge region 22, the door 21 will open as a whole and allow the airbag 11 to be fully deployed via the full opening 37 smoothly. Moreover, if an arrangement proportion of the bridged tear region 25 and thinned tear regions 31 in the tearable region 23 is varied, an opening behavior of the leading end 21f region of the door 12 as well as a deployment behavior of the airbag 11 in an initial stage of deployment can be changed. A steady deployment behavior in the initial stage of deployment will steady a following deployment behavior, which will lead to a smooth airbag deployment.

More specifically, in the illustrated embodiment, since the central region 25a of the bridged tear region 25 is disposed at the upper end or leading end 21f of the door 21 and the door 21 starts to open from the upper end 21f, the airbag 11 will be easily deployed along and over the rear panel 7a of the glove box 7, such that the airbag 11 will be further smoothly deployed between a narrow space between the knees KL and KR of the passenger M and the rear panel 7a of the glove box 7 and rear plane 6b of the dashboard 6, and then inflated and catch the knees KL and KR smoothly.

Therefore, the airbag cover 20 of the illustrated embodiment will help deploy the airbag 11 in a predetermined contour in a steady fashion with the combined use of the thinned tear region 31 and the bridged tear region 25.

The airbag cover 20 of the illustrated embodiment includes the ceiling wall 40 which has the first surface 40a forming the decorative surface and the second surface 40b, and the side wall 42 which extends from the outer circumferential edge of the ceiling wall 40 generally perpendicularly to the ceiling wall 40 and towards a direction facing away from the decorative surface. The side wall 42 is adapted to be retained by the case (housing) 12 and includes the joint region 51 which is held by the housing 12. The hinge region 22 is disposed in a vicinity of the intersection 41 (41D) of the ceiling wall 40 and the side wall 42 on the inner surface 42b of the side wall 42. The bridged tear region 25 is disposed in the areas 44, 46 and 47 of the side wall 42 distant from the hinge region 22 and between the joint region 51 and the ceiling wall 40. Each of the thinned tear regions 31L and 31R is composed of the groove 33 which is formed on the second surface 40b of the ceiling wall 40 for forming the thinned region 32. Each of the grooves 33 extends from the first end 22a/second end 22b of the hinge region 22 along and in proximity to the side wall 42. Each of the thinned tear regions 31L and 31R further includes, at the first end 25a/second end 25b of the bridged tear region 25, the concave section 35L/35R which extends from the side wall 42 to the second surface 40b of the ceiling wall 42 in such a manner as to joint the bridged tear region 25 and the groove 33 of the thinned tear region 31L/31R. The door 21 includes the lower ceiling region 21b which is a region of the ceiling wall 40 surrounded by the thinned tear regions 31L and 31R, the upper ceiling region 21a which is a remaining region of the ceiling wall 40 surrounded by the bridged tear region 25, and the regions 21c, 21d and 21e of the side wall 42 ranging from the bridged tear region 25 to the ceiling wall 40.

With this configuration, at airbag deployment, the bridging regions 26 of the bridged tear region 25 will be directly pulled by the ceiling wall 40 pushed by the airbag 11, thus break quickly.

Further, in the illustrated embodiment, although the bridged tear region 25 includes the perforations 27 formed through the airbag cover 20, the bridged tear region 25 is disposed on the side wall 42 which extends generally perpendicularly to the ceiling wall 40 towards a direction facing away from the decorative surface 40a. With this configuration, the perforations 27 will be hardly seen when mounted on the vehicle. Moreover, since the grooves 33 forming the thinned tear regions 31 are formed on the rear surface (second surface) 40, not on the decorative surface (first surface) 40a, of the ceiling wall 40, the thinned tear regions 31 do not affect the appearance of the decorative surface 40a. Therefore, the above configuration of the illustrated embodiment will contribute to maintaining of a good appearance of the airbag cover 20.

The door 21 includes the region 21b of the ceiling wall 40 surrounded by the thinned tear regions 31L and 31R, the region 21a of the ceiling wall 40 surrounded by the bridged tear region 25, and the regions 21c, 21d and 21e of the side wall 42 ranging from the bridged tear region 25 to the ceiling wall 40, thus is configured to open a whole area of the ceiling wall 40 surrounded by the side wall 42. This configuration will provide a large opening 37 in a whole area inside the side wall 42, which will enable a smooth and quick airbag deployment.

Especially, in the illustrated embodiment, the ceiling wall 40 is formed into a generally rectangular plate and the side wall 42 is formed into a generally square tube extending from the outer circumferential edge of the ceiling wall 40. The side wall 42 includes the first wall portion 43 and the second wall portion 44 which are opposed to each other, and the third wall portion 46 and the fourth wall portion 47 which are opposed to each other in a direction orthogonal to an opposing direction of the first wall portion 43 and second wall portion 44. The hinge region 22 is disposed in a vicinity of an intersection of the ceiling wall 40 and the first wall portion 43 of the side wall 42. The concave sections 35L and 35R are disposed on the third wall portion 43 and fourth wall portion 44. The bridged tear region 25 is disposed on the second wall portion 44 and further continuously extends over the third wall portion 46 and fourth wall portion 47 up to positions adjoining the concave sections 35L and 35R.

In other words, the bridged tear region 25 having a superior cleaving performance is disposed on a whole second wall portion 44 of the side wall 42 which is distant from the hinge region 22, and further extends over the areas of the third wall portion 46 and fourth wall portion 47 distant from the hinge region 22. This configuration will form a generally rectangular opening 38 at an area surrounded by the bridged tear region 25 at a distance from the hinge region 22 for allowing the airbag 11 to exit in the initial stage of airbag deployment. That is, the airbag 11 will firstly protrude out of this rectangular opening 38, not out of the large opening 37 formed in a whole area inside the side wall 42. This configuration will be suitable for a deployment mode which is aimed to deploy the airbag 11 at a vicinity of the second wall portion 44 distant from the hinge region 22 in an initial stage of airbag deployment.

That is, the above configuration will help let out the airbag 11 from a rear upper end of the airbag device 10, i.e. from a rear upper end 20a of the airbag cover 20, and deploy the airbag 11 upward along and over the rear panel 7a of the glove box 7 in the initial stage of airbag deployment. Such a deployment mode will be suitable for an airbag device 10 for knee protection which needs to deploy the airbag 11 between a narrow space between the knees KL and KR of the passenger M and the rear panel 7a of the glove box 7 and rear plane region 6b of the dashboard 6 as a member of vehicle body.

If such an advantageous effect does not have to be considered, the airbag cover may be configured to have a generally circular tubular side wall in which a bridged tear region is located away from a hinge region and a thinned tear region is disposed in a vicinity of the hinge region on the ceiling wall.

In the illustrated embodiment, the fourth wall portion 47 of the side wall 42 (i.e. at least one of the third wall portion 46 and fourth wall portion 47) includes the through opening 53 at an area 47a distant from the bridged tear region 25R and distant from the ceiling wall 40.

The through opening 53 is useful for receiving the root end region 16a of the inflator 16 for supplying the airbag 11 with an inflation gas. That is, this configuration will be useful for receiving any component of the airbag device 10 which would be disposed inside the side wall 42 and have to let a part of it out of the side wall 42.

Although the through opening 53 is formed only on the fourth wall portion 47 of the side wall 42 in the illustrated embodiment, it may be formed on the third wall portion 46 as well, when, by way of example, such a component as a mounting bracket 15 of the case 12 is disposed to penetrate the third wall portion 46 as well as the fourth wall portion 47. Of course, such a through opening 53 may also be formed only on the third wall portion 46.

If the through opening 53 is formed on one of the third wall portion 46 or fourth wall portion 47 of the side wall 42, the bridged tear region 25L or 25R cannot be extended to the first wall portion 43. In the illustrated embodiment, however, the bridged tear region 25 continues, through the medium of the concave sections 35L and 35R, to the thinned tear regions 31L and 31R formed along and in proximity to the third wall portion 46/fourth wall portion 47 and first wall portion 43 on the rear surface 40b of the ceiling wall 40. This configuration will allow a whole area inside the side wall 42 to open, such that the airbag 11 can protrude therefrom smoothly.

In the illustrated embodiment, moreover, in the bridged tear region 25, the intersection 42c of the second wall portion 44 and third wall portion 46 and the intersection 42d of the second wall portion 44 and fourth wall portion 47 are each composed of one of the perforations 27.

That is, no bridging regions 26 is disposed at the intersection or corner 42c of the second wall portion 44 and third wall portion 46 and at the intersection or corner 42d of the second wall portion 44 and fourth wall portion 47. This configuration will help cleave the bridged tear region 25 smoothly when cleaving proceeds from the bridged tear region 25U of the second wall portion 44 to the bridged tear regions 25L and 25R of the third wall portion 46 and fourth wall portion 47.

The airbag cover 20 of the illustrated embodiment includes the side wall 42 which bends generally perpendicularly with respect to the ceiling wall 40 in a direction facing away from the decorative face 40a, and the perforations 27 of the bridged tear region 25 are disposed on a part (i.e. on the second wall portion 44, third wall portion 46 and fourth wall portion 47) of the side wall 42. Accordingly, the openings 27a of the perforations 27 are not easily seen. Moreover, since the perforations 27 are formed at the bottom 29 of the groove 28 denting from the outer surface of the side wall 42, the openings 27a of the perforations 27 are hidden behind a straight edge 28a of the groove 28 and further not easily seen. Even if the openings 27 can be seen, they cannot be seen clearly because they are disposed at a recessed and obscure area behind the edge 28a of the groove 28.

Therefore, the airbag cover 20 of the illustrated embodiment keeps a good appearance even with the bridged tear region 25, because the openings 27a of the perforations 27 of the bridged tear region 25 are not easily seen.

Especially, the airbag cover 20 of the illustrated embodiment is designed such that, when mounted on the vehicle, the decorative surface 40a is generally flush with surrounding members of vehicle such as the rear panel 7a of the glove box 7 and the undercover 8 and, a portion of the side wall 42 in a vicinity of the leading end 21f of the door 21 (i.e. the second wall portion 44) is disposed at such a position that is easier to see from the passenger M (i.e. the object of protection) in comparison with a portion of the side wall 42 in a vicinity of the hinge region 22 (i.e. the first wall region 43). That is, even if the second wall portion 44 is disposed on the upper side in sight of the passenger M, the openings 27a of the perforations 27 of the bridged tear region 25U will still be hard to see because the openings 27a are hidden behind the straight edge 28a of the groove 28 extending in a left and right direction.

Further especially, in the illustrated embodiment, the bridged tear region 25U is located proximate the intersection 41U of the ceiling wall 40 and second wall portion 44, as shown in FIGS. 2 and 3. The airbag cover 20 is disposed beneath the glove box 7 which is designed to open rearward and downward. Since the lower edge 7b of the glove box 7 oscillates rearwards and downwards at opening as indicated by double-dotted lines in FIG. 2, the airbag cover 20 needs to be mounted such that a larger clearance H0 is provided between the rear upper end 20a (i.e. the intersection 41U) and the lower edge 7b of the glove box 7 in consideration of the behavior of the glove box 7 at opening than a clearance between the third wall portion 46, fourth wall portion 47 and first wall portion 43 and a surrounding member of vehicle (the undercover 8, in the illustrated embodiment). Even in this situation where the large clearance H0 is disposed above the airbag cover 20 and places the second wall portion 44 in a visible condition, the openings 27a of the perforations 27 of the bridged tear region 25U will still not be easily recognizable because the openings 27a are hidden behind the straight edge 28a of the groove 28 extending in a left and right direction, as described above.

In the illustrated embodiment, the edge 28a of the groove 28 forming the bridged tear region 25 is set back from the decorative surface 40a of the ceiling wall 40 by the clearance LT of about 5 mm, as shown in FIG. 7, and the depth Dt of the groove 28 is about 2 mm, as shown in FIG. 11. This configuration makes the opening 27a of the perforations 27 further unrecognizable.

In an instance where a bridged tear region is disposed simply in order to steady a starting point of cleavage of a tearable region, not in order to keep a good appearance of an airbag cover, the bridged tear region may be composed of alternate perforations and bridging regions simply formed on an outer surface of the airbag cover, without forming a groove like the groove 28 of the foregoing embodiment. The bridged tear region may also be formed by providing a groove 28 on an inner surface of the airbag cover such that the perforations are formed at the bottom of the groove 28.

Figure 13:
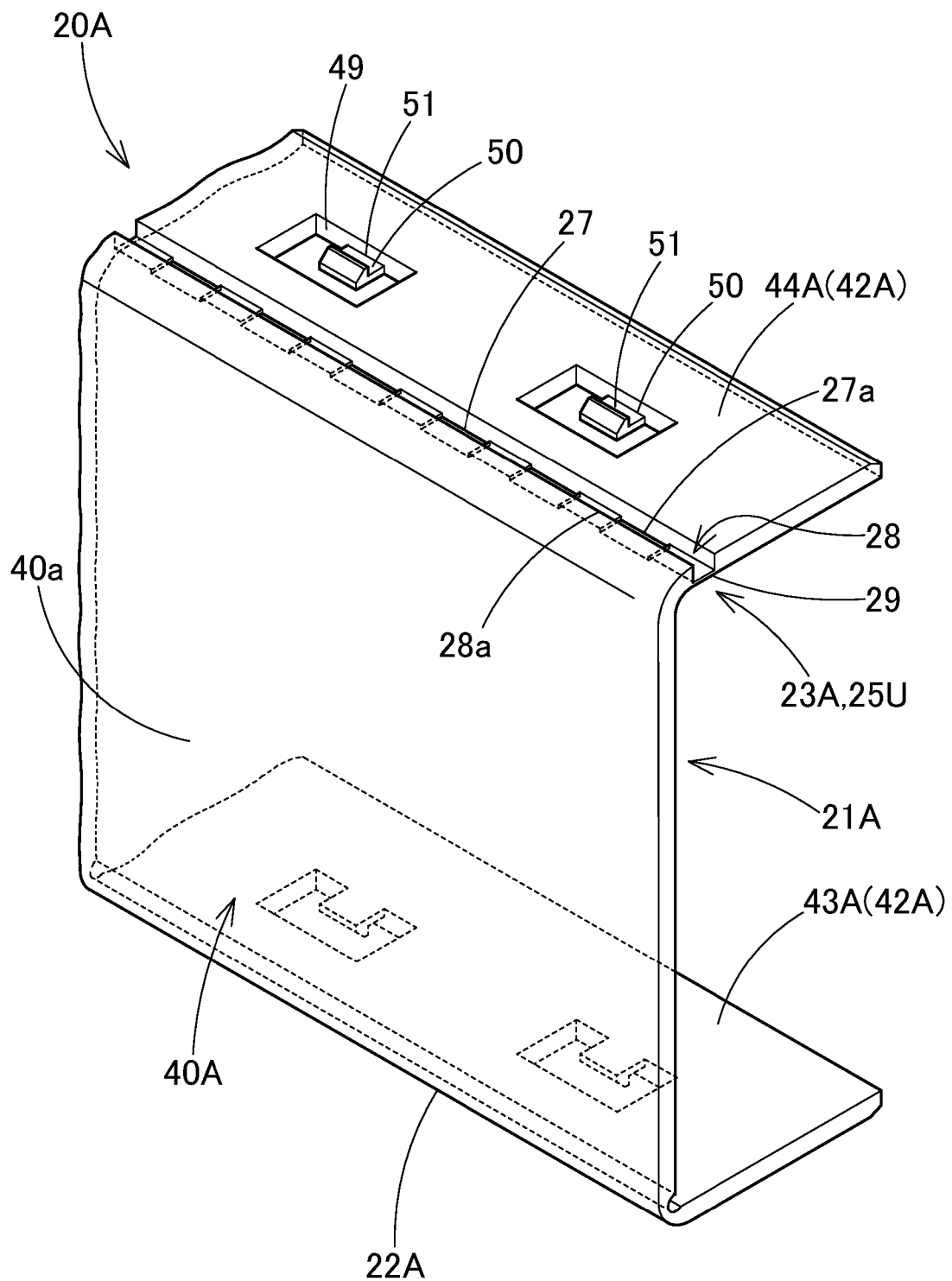
FIG. 13 is a schematic partial perspective view of an airbag cover according to an alternative embodiment of the invention.
Figure 14:
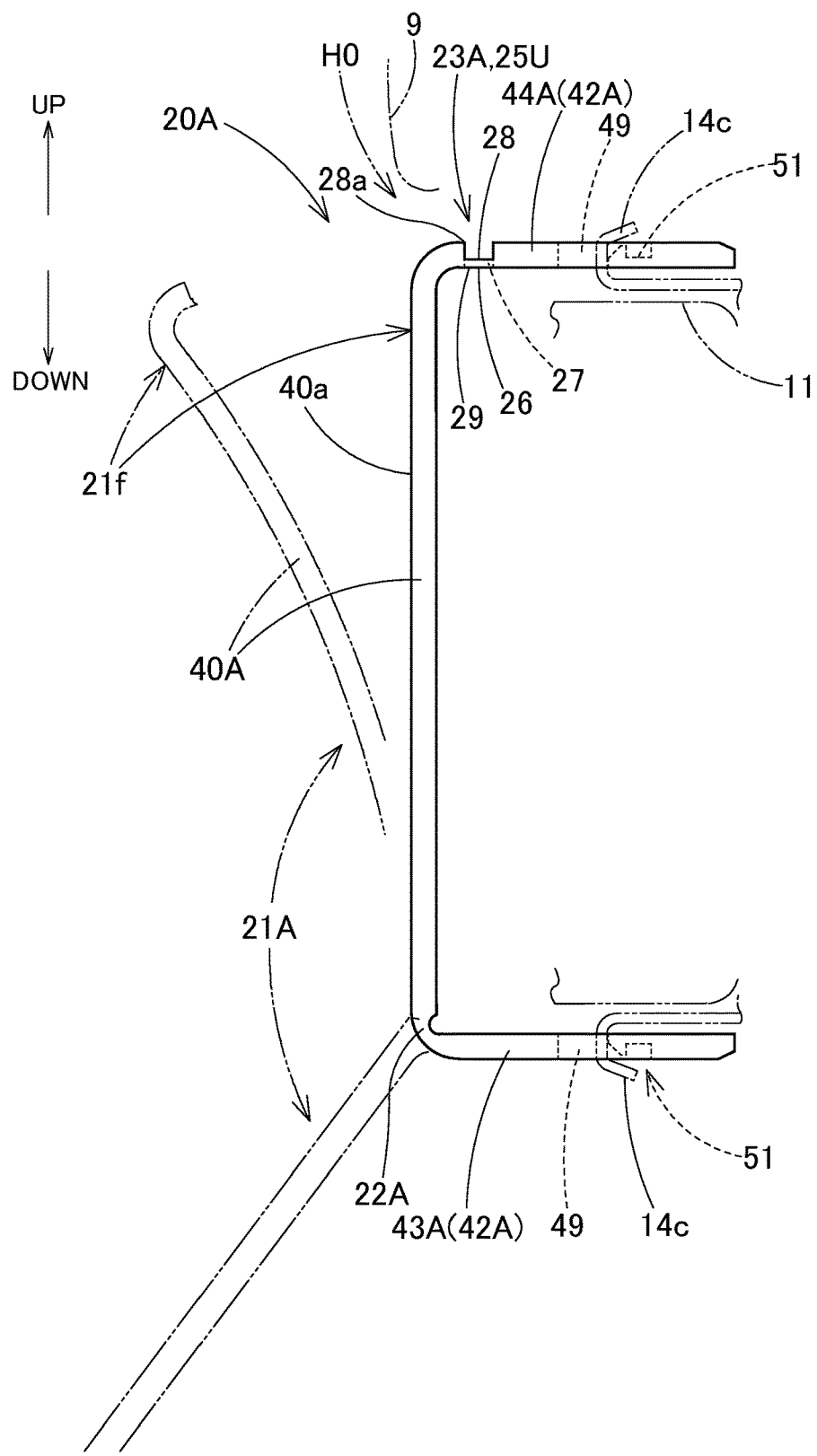
FIG. 14 depicts the way a door of the airbag cover of FIG. 13 opens by side view.

In an airbag cover which includes such a bridged tear region 25 that is composed of a groove 28 so as to make openings 27a of perforations 27 unrecognizable, a tearable region may be composed of the bridged tear region only, as shown in FIGS. 13 and 14.

An airbag cover 20A depicted in FIGS. 13 and 14 is designed to cover an airbag 11 which is stored in an airbag housing in a folded-up configuration and is configured to be deployed for protecting an object of protection, similarly to the airbag cover 20 of the foregoing embodiment. The airbag cover 20A has a U-shaped sectional contour. The airbag cover 20A includes a ceiling wall 40A which covers the airbag 11 and has a first surface forming a decorative surface 40a and a second surface, and a side wall 42A which extends from an outer circumferential edge of the ceiling wall 40A generally perpendicularly to the ceiling wall 40A and towards a direction facing away from the decorative surface 40a. The side wall 42A includes a first portion 43A and a second portion 44A which are opposed to each other and each include a joint region 51 for joint with the airbag housing. The ceiling wall 40A is provided with a door 21A which is configured to open when pushed by the airbag 11 as inflated for allowing airbag emergence. A hinge region 22A of the door 21A, which holds the door 21A as opened, is disposed in a vicinity of the ceiling wall 40A on the first portion 43A of the side wall 42A. The airbag cover 20A includes a bridged tear region 25U which is breakable for allowing the door 21A to open and serves as a tearable region 23A. The bridged tear region 25U is disposed on the second portion 44A of the side wall 42A between the joint region 51 and the ceiling wall 40A in a vicinity of a leading end of the door 21A as opened and at a distance from the hinge region 22A. The bridged tear region 25A includes a plurality of perforations 27 formed through the second portion 44A of the side wall 42A and a plurality of bridging regions 26 disposed between the perforations 27, and is configured to break when the bridging regions 26 break. This bridged tear region 25U also includes a groove 28 which dents from an outer surface of the second portion 44A and extends over an entire location of the bridged tear region 25U, and the perforations 27 of the bridged tear region 25U are formed intermittently at the bottom of the groove 28.

If the airbag cover 20A is mounted on a vehicle in such a manner that a large clearance H0 is provided between the ceiling wall 40A and a member 9 of vehicle disposed above the airbag cover 20A, and the second portion 44A of the side wall 42A is placed in a visible condition, the openings 27a of the perforations 27 of the bridged tear region 25U will not be easily recognizable because the openings 27a are hidden behind a straight edge 28a of the groove 28 extending in a left and right direction, as described above. Therefore, the bridged tear region 25U will not affect an appearance of the airbag cover 20A.

The foregoing embodiment is based on a presumption that the airbag cover 20 is employed in an airbag device 10 for protection of knees K of a front seat passenger M. However, the application of the present invention should not be limited thereby. By way of example, the invention may also be applied to an airbag cover adapted to be employed in an airbag device for protection of knees of a driver, or to an airbag cover of an airbag device adapted to be mounted on an instrument panel 6 in front of a passenger seat.

What is claimed is:

1. An airbag cover adapted to be jointed with an airbag housing for covering an airbag which is housed in the airbag housing in a folded-up configuration, the airbag cover comprising:
    a door that is openable when pushed by the airbag as inflated for allowing airbag emergence;
    a hinge region of the door that holds the door as opened; and
    a tearable region that is disposed in a circumference of the door and configured to break when pushed by the airbag for allowing the door to open, the tearable region comprises:
        a bridged tear region that includes a plurality of perforations formed through the airbag cover and a plurality of bridging regions disposed between the perforations, and is configured to break when the bridging regions break, the bridged tear region being disposed at a leading end portion of the door as opened, distant from the hinge region; and
        a plurality of thinned tear regions, each thinned tear region of the plurality of thinned tear regions includes a continuous thinned region and is configured to break when the thinned region breaks, one of the thinned tear regions being disposed in an area ranging from a first end of the hinge region to a first end of the bridged tear region and another one of the thinned tear regions being disposed in an area ranging from a second end of the hinge region to a second end of the bridged tear region,
    wherein the bridged tear region is arranged in a U shape and includes a leading end region which is disposed distant from the hinge region, corners which bend from both ends of the leading end region, and two regions which extend from the corners and continued to the thinned tear regions.

2. The airbag cover of claim 1, wherein:
    the airbag cover further comprises:
        a ceiling wall that has a first surface forming a decorative surface and a second surface; and
        a side wall that extends from an outer circumferential edge of the ceiling wall generally perpendicularly to the ceiling wall and towards a direction facing away from the decorative surface;
    the side wall includes a joint region for joint with the airbag housing:
    the hinge region is disposed in a vicinity of an intersection of the ceiling wall and the side wall on an inner side of the side wall;
    the bridged tear region is disposed in a portion of the side wall distant from the hinge region and between the joint region and the ceiling wall;
    each of the thinned tear regions is composed of a groove that is formed on the second surface of the ceiling wall and forms the thinned region, the groove extending from each of the first and second ends of the hinge region along and in proximity to the side wall;
    each of the thinned tear regions further includes a concave section that extends from the side wall to the second surface of the ceiling wall at each of the first and second ends of the bridged tear region in such a manner as to joint the bridged tear region and the groove; and
    the door comprises:
        a region of the ceiling wall surrounded by the thinned tear regions;
        a remaining region of the ceiling wall surrounded by the bridged tear region; and
        a region of the side wall ranging from the bridged tear region to the ceiling wall.

3. The airbag cover of claim 2, wherein:
    the ceiling wall is formed into a generally rectangular plate and the side wall is formed into a generally square tube;
    the side wall comprises a first wall portion and a second wall portion that are opposed to each other, and a third wall portion and a fourth wall portion that are opposed to each other in a direction orthogonal to an opposing direction of the first wall portion and second wall portion;
    the hinge region is disposed on the first wall portion of the side wall;
    the concave sections are disposed on the third wall portion and fourth wall portion; and
    the bridged tear region is disposed on the second wall portion and further continuously extends to the third wall portion and fourth wall portion up to positions adjoining the concave sections.

4. The airbag cover of claim 3, wherein at least one of the third wall portion and fourth wall portion includes a through opening at a portion thereof distant from the bridged tear region and distant from the ceiling wall.

5. The airbag cover of claim 3, wherein an intersection of the second wall portion and third wall portion and an intersection of the second wall portion and fourth wall portion in the bridged tear region are each composed of one of the perforations.

6. The airbag cover of claim 1, wherein:
each of the bridging regions has a first edge and a second edge, each of the bridging regions is configured such that the first edge disposed closer to the door has a greater width than a width of the second edge disposed distant from the door.

7. An airbag cover adapted to be jointed with an airbag housing for covering an airbag which is housed in the airbag housing in a folded-up configuration and deployable for protecting an object of protection, the airbag cover comprising:
a ceiling wall that covers the airbag and has a first surface forming a decorative surface and a second surface;
a side wall that extends from an outer circumferential edge of the ceiling wall generally perpendicularly to the ceiling wall and towards a direction facing away from the decorative surface, the side wall including a first portion and a second portion that are opposed to each other and each include a joint region for joint with the airbag housing;
a door that is disposed on the ceiling wall and is configured to open when pushed by the airbag as inflated for allowing airbag emergence;
a hinge region of the door that holds the door as opened, the hinge region being disposed in a vicinity of the ceiling wall on the first portion of the side wall;
a bridged tear region that is breakable for allowing the door to open, the bridged tear region being disposed on the second portion of the side wall between the joint region and the ceiling wall in a vicinity of a leading end of the door as opened, wherein the bridged tear region includes a plurality of perforations formed through the second portion of the side wall and a plurality of bridging regions disposed between the perforations, and is configured to break when the bridging regions break; wherein a groove denting from an outer surface of the side wall extends over a location of the bridged tear region; and wherein the perforations of the bridged tear region are formed intermittently at a bottom of the groove.

8. The airbag cover of claim 7 configured such that, when mounted on a vehicle, the decorative surface of the ceiling wall forms a generally flush surface together with a surrounding member of the vehicle and the second portion of the side wall disposed in the vicinity of the leading end of the door as opened is disposed at such a position that is easier to see from the object of protection in comparison with the first portion of the side wall.

* * * * *